United States Patent
Hartmann et al.

(10) Patent No.: US 12,263,533 B2
(45) Date of Patent: Apr. 1, 2025

(54) SPECTRALLY BROADENING ULTRASHORT-PULSE COMPRESSOR

(71) Applicant: Coherent, Inc., Santa Clara, CA (US)

(72) Inventors: Nick Hartmann, Seattle, WA (US); Michael Hertwig, San Ramon, CA (US)

(73) Assignee: Coherent, Inc., Santa Clara, CA (US)

( * ) Notice: Subject to any disclaimer, the term of this patent is extended or adjusted under 35 U.S.C. 154(b) by 914 days.

(21) Appl. No.: 17/148,521

(22) Filed: Jan. 13, 2021

(65) Prior Publication Data

US 2022/0219259 A1  Jul. 14, 2022

(51) Int. Cl.
*B23K 26/0622* (2014.01)
*B23K 26/046* (2014.01)
*B23K 26/06* (2014.01)

(52) U.S. Cl.
CPC ........ *B23K 26/0624* (2015.10); *B23K 26/046* (2013.01); *B23K 26/0643* (2013.01); *B23K 26/0648* (2013.01)

(58) Field of Classification Search
CPC .............. B23K 26/0624; B23K 26/046; B23K 26/0643; B23K 26/0648; H01S 3/0092; H01S 3/0071; H01S 3/0057; H01S 3/08081; H01S 3/0818
See application file for complete search history.

(56) References Cited

U.S. PATENT DOCUMENTS

| | | | |
|---|---|---|---|
| 6,620,154 B1 * | 9/2003 | Amirkhanian | A61F 9/008 606/17 |
| 7,688,493 B2 * | 3/2010 | Resan | B23K 26/0624 359/238 |
| 9,244,332 B1 * | 1/2016 | Calendron | G02F 1/39 |
| 9,515,445 B2 | 12/2016 | Hodgson et al. | |
| 9,847,615 B2 | 12/2017 | Russbueldt et al. | |

(Continued)

OTHER PUBLICATIONS

Lu et al., Design and analysis of a pair of prisms for widening the imaging range of an optical system, Pub. Jan. 6, 2021, 2021 Society of Photo-Optical Instrumentation Engineers (SPIE) (Year: 2021).*

(Continued)

*Primary Examiner* — Helena Kosanovic
*Assistant Examiner* — Thao Uyen Tran-Le
(74) *Attorney, Agent, or Firm* — Morrison & Foerster LLP

(57) ABSTRACT

An ultrashort-pulse compressor includes (a) one or more bulk-optics intersecting a propagation path of an ultrashort-pulsed laser beam multiple times to spectrally broaden a pulse of the laser beam during each of multiple passes through the bulk-optic(s), (b) one or more dispersive optics for compressing a duration of the pulse after each of the multiple passes, and (c) a plurality of focusing elements for focusing the laser beam between the multiple passes. Propagation distances between the bulk-optic(s) and the focusing elements are detuned from imaging such that a spot size of the laser beam, at the bulk-optic(s), is greater at each successive one of the multiple passes. As the laser beam propagates through this compressor, each laser pulse is alternatingly spectral broadened and temporally compressed. The increasing spot size of the laser, for each pass, helps prevent optical damage, run-away self-focusing, and other undesirable outcomes.

30 Claims, 14 Drawing Sheets

(56) References Cited

U.S. PATENT DOCUMENTS

| | | | |
|---|---|---|---|
| 9,971,229 B2 | 5/2018 | Kung et al. | |
| 2007/0086493 A1* | 4/2007 | Apolonski | H01S 3/1112 |
| | | | 372/18 |
| 2012/0230352 A1* | 9/2012 | Minelly | H01S 3/09415 |
| | | | 372/6 |
| 2014/0133503 A1* | 5/2014 | Peng | H01S 3/067 |
| | | | 359/341.5 |
| 2014/0328365 A1* | 11/2014 | Grujic | H01S 3/027 |
| | | | 372/107 |
| 2016/0087390 A1* | 3/2016 | Hodgson | G02B 17/023 |
| | | | 359/326 |
| 2019/0305500 A1* | 10/2019 | Antier | H01S 3/2316 |
| 2019/0003467 A1 | 12/2019 | Zhao et al. | |

OTHER PUBLICATIONS

Cao et al., (2019). "Multipass-cell-based post-compression of radially and azimuthally polarized pulses to the sub-two-cycle regime," Journal Of The Optical Society Of America—B., 36(9):2517-2525.

Hanna et al., (2021). "Nonlinear beam matching to gas-filled multipass cells," OSA Continuum, 4(2):732-738.

International Search Report and Written Opinion received for International Patent Application No. PCT/US2021/065583 mailed on Apr. 14, 2022, 13 pages.

Jargot et al., (2018). "Self-compression in a multipass cell," Optics Letters, 43(22):5643, 4 pages.

Beetar et al., (2018). "Spectral broadening and pulse compression of a 400 µJ, 20 W Yb:KGW laser using a multi-plate medium,"Applied Physics Letters, 112:051102, 5 pages.

Cheng et al., (2016). "Supercontinuum generation in a multi-plate medium," Optics Express, 24(7):7224-7231.

Hanna et al., (2017). "Nonlinear temporal compression in multipass cells: theory," J. Optical Society of America B, 34(7):1340-1347.

Lu et al., (2014). "Generation of intense supercontinuum in condensed media," Optica, 1(6):400-406.

Russbueldt et al., (2015). "Innoslab Amplifiers," IEE Journal of Selected Topics in Quantum Electronics, 21(1):3100117, 17 pages.

Seidel et al., (2016). "All solid-state spectral broadening: an average and peak power scalable method for compression of ultrashort pulses," Optics Express, 24(9):9412-9428.

* cited by examiner

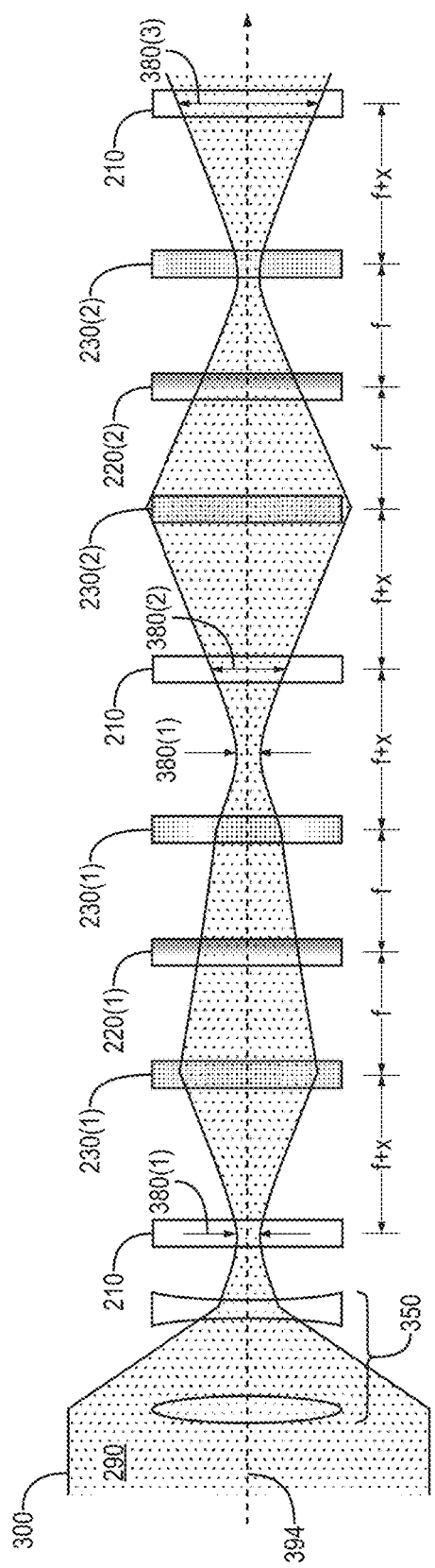
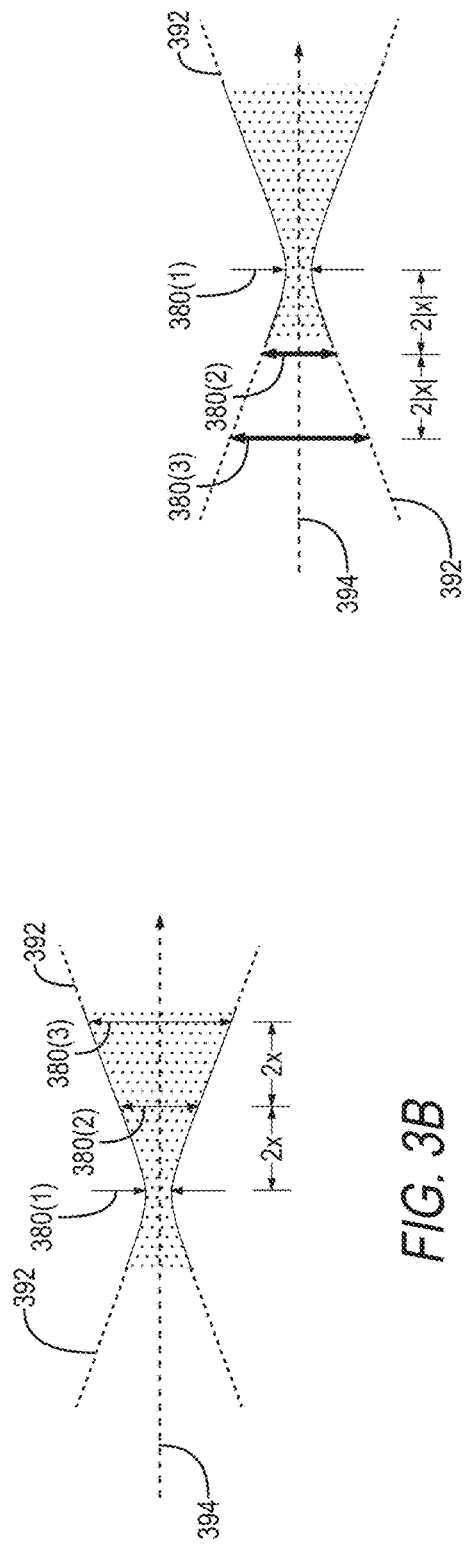
FIG. 3A
FIG. 3B
FIG. 4

SPECTRALLY BROADENING ULTRASHORT-PULSE COMPRESSOR

TECHNICAL FIELD OF THE INVENTION

The present invention relates in general to compression of the duration of ultrashort laser pulses, in particular to techniques for achieving such compression based on spectral broadening in a solid-state medium and with minimal degradation of the laser beam parameters.

DISCUSSION OF BACKGROUND ART

Laser pulses are considered ultrashort when their duration is less than a few picoseconds. Ultrashort laser pulses may attain very high peak powers. Ultrashort laser pulses are commonly used in scientific, industrial, and medical applications. Scientific applications include time-resolved studies of molecular dynamics and chemical reactions. In industrial applications, the ultrashort laser pulses are typically used for cutting, drilling, marking, or other machining that benefits from the unique material interaction properties of ultrashort laser pulses. Since the pulse duration is orders of magnitude shorter than the characteristic timescales for thermal diffusion in the material, the heat-affected zone does not extend far beyond the laser beam, and ultrashort laser pulses are therefore capable of processing material in a very precise fashion. One of the best-known medical applications of ultrashort laser pulses is in LASIK eye surgery, where femtosecond laser pulses may be used as the cutting-tool to make incisions in the cornea.

Many of these applications benefit from the pulse duration being as short as possible. Ultrashort laser pulses are typically generated in a resonator having a gain medium and operating in a mode-locked condition. Outside the resonator, and possibly after further amplification, the pulse duration may be reduced in a pulse compressor. However, the minimum obtainable pulse duration is limited by the time-bandwidth product and therefore by the spectral bandwidth of the laser pulses. The pulse duration is fundamentally limited by the amplification bandwidth of the gain medium used to generate and/or amplify the ultrashort laser pulses. However, gain medium properties also affect other important parameters, such as the average power of the generated and amplified beam of ultrashort laser pulses. It is often not possible to find a gain medium that has the amplification bandwidth sufficient to achieve a certain pulse duration while also satisfying other important requirements.

In some situations, the spectral bandwidth of the ultrashort laser pulses is insufficient to achieve a desired pulse duration, even if the pulse is compressed to the limit defined by the minimum time-bandwidth product. In these situations, a spectral broadening system may be invoked to deliberately broaden the spectral bandwidth of the pulse, whereafter the pulse can be compressed to a shorter duration. The most widely used method for such compression of an ultrashort laser pulse entails first broadening the spectrum of the pulse, which generates a chirped pulse characterized by a spectral gradient as a function of time, and then compressing the chirped pulse by dechirping the spectral gradient with a dispersive optic to temporally overlap all spectral components of the pulse. The spectral-broadening step takes place in a nonlinear medium and is based on self-phase modulation of the ultrashort laser pulse induced by the Kerr effect.

Optical fibers are a common choice for the nonlinear medium. However, in the case of high-intensity ultrashort laser pulses, the peak power may exceed the critical power in solid-state media for run-away self-focusing, caused by the Kerr effect, with detrimental effect on the laser beam profile and potential damage of the solid-state medium. Therefore, the more common choice for compression of high-intensity ultrashort laser pulses is a long gas-filled hollow-core optical fiber, where the laser beam propagates primarily in the gas and the gas serves as the nonlinear medium.

Solid-state solutions have been proposed. In one such scheme, disclosed by Kung et al. in U.S. Pat. No. 9,971,229, the laser beam is directed through a series of thin plates. Each plate imparts some degree of spectral broadening through Kerr-effect-induced self-phase modulation. Each plate is sufficiently thin that the beam waist produced by the related Kerr lens is after that the laser beam has exited the plate. The plates are distanced from each other to allow the laser beam to come to a focus and expand again before reaching the next plate.

SUMMARY OF THE INVENTION

Disclosed herein are systems and methods for compression of ultrashort laser pulses based on deliberate spectral broadening in spectrally broadening, bulk-optics. The spectrally broadening bulk-optics used herein are solid-state bulk media. The use of solid-state bulk media, as opposed to a gas-filled optical fiber or other gas-based solutions, eliminates the need for a gas supply and related hardware and offers a more compact solution. The ultrashort pulse is alternatingly (a) spectrally broadened in a broadening bulk-optic (or a set of broadening bulk-optics) while developing a chirp and (b) temporally compressed by a dechirping dispersive optical element. As the ultrashort pulse progresses through this series of alternating spectral broadening and temporally compressing dechirping, additional focusing optics control the laser beam size such that the spot size is greater at each successive repetition of spectral broadening. This scheme may be realized in a multipass configuration, wherein the laser beam makes multiple passes through the same broadening bulk-optic or the same set of broadening bulk-optics. Alternatively, the scheme may be realized in an unfolded configuration, wherein the laser beam passes through a series of broadening bulk-optics (or sets of broadening bulk-optics), with a dispersive optical element after each broadening bulk-optic (or set of broadening bulk-optics) and with focusing optics interspersed in the series.

Generally speaking, perfect temporal compression of a spectrally broadened ultrashort pulse requires a dispersive optic with a group delay dispersion that perfectly matches the chirp introduced by spectral broadening. The chirp introduced in each pass through the broadening bulk-optic(s) may be mostly linear, however with smaller nonlinear components as well. We have realized that, if the ultrashort pulse is allowed to make multiple passes through the broadening bulk-optic(s) before being dechirped, these nonlinear components tend to increase in amplitude and become increasingly nonlinear, ultimately resulting in a chirp that is too complex for even approximate dechirping. Significant dechirping imperfection amounts to unsatisfactory temporal compression. We have found that the present scheme of dechirping the ultrashort pulse after every pass through the broadening bulk-optic(s) helps minimize any compounded nonlinear effect of repeatedly applied spectral broadening. In this scheme, good pulse compression may be achieved with dispersive optics characterized by a linear group delay dispersion.

As the duration of the ultrashort pulse is shortened by each repetition of the spectral broadening and temporal compression steps, the peak power of the ultrashort pulse increases. The increase in spot size for each successive repetition of the spectral broadening step serves to achieve substantial spectral broadening in each pass while keeping the peak intensity below the damage threshold of the broadening bulk-optic(s) and keeping the B-integral (the on-axis nonlinear phase shift incurred through self-phase modulation in the broadening bulk-optic(s)) below the limit for run-away self-focusing and related undesirable outcomes. These undesirable outcomes may include a substantial change in the output beam parameters, filamentation formation causing degradation of the beam parameters, and failure to satisfactorily compress the pulse. In some implementations, the spot size increase is designed to keep the peak intensity below the damage threshold, and keep the B-integral below a limit of about 2.0 radians (rad) to avoid self-focusing and other related undesirable outcomes. The spot size increase may also be tuned to maintain a similar B-integral for each pass through the broadening bulk-optic(s), so as to maximize the spectral broadening achieved in each pass while avoiding self-focusing and other related undesirable outcomes.

In operation, the present scheme is likely to experience variation in the input beam properties, for example variation in pulse energy and other parameters that affect the power of the Kerr lens in the broadening bulk-optic(s). To reduce the sensitivity of the beam size progression through the system to such variation, the present scheme may be implemented in a near-imaging-condition configuration, where the propagation distance between subsequent passes through the broadening bulk-optic(s) is only slightly detuned from the propagation distance required to reimage the beam within the broadening bulk-optic(s) from pass to pass. The present scheme may further utilize adjustment of the thickness of the broadening bulk-optic(s) so as to stabilize the B-integral in the presence of changes to the input pulse energy or power.

In one aspect, an ultrashort-pulse compressor includes one or more broadening bulk-optics arranged to intersect a propagation path of an ultrashort-pulsed laser beam multiple times so as to spectrally broaden a pulse of the laser beam during each of multiple passes through the one or more broadening bulk-optics. The compressor also includes one or more dispersive optics for compressing a duration of the pulse after each of the multiple passes. In addition, the compressor includes a plurality of focusing elements for focusing the laser beam between the multiple passes. The focusing elements are arranged around the one or more broadening bulk-optics. Distances between the one or more broadening bulk-optics and the focusing elements along the propagation path are detuned from imaging such that a spot size of the laser beam, at the one or more broadening bulk-optics, is greater at each successive one of the multiple passes.

In another aspect, a method for compressing an ultrashort pulse of a laser beam includes repeating a group of steps of (a) spectrally broadening and chirping the pulse in one or more broadening bulk-optics, (b) dechirping the pulse, after the spectrally broadening step, to compress duration of the pulse, and (c) focusing the laser beam to set a spot size of the laser beam on the one or more broadening bulk-optics in the spectrally broadening step. Propagation distances of the laser beam between the spectrally broadening step of each successive repetition of the group of steps are detuned from imaging such that the spot size is greater for each successive repetition of the group of steps.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIGS. 3A and 3B are cross-sectional side-views that illustrate the transverse profile of a laser beam (shaded) when propagating through one example of a near-imaging-condition embodiment of the compressor of FIG. 2 configured with a positive detuning parameter.

FIG. 4 shows the equivalent cross sections of the laser beam that are imaged onto successive passes through the broadening bulk-optic(s) of an example of a near-imaging-condition embodiment of the compressor of FIG. 2 configured with a negative detuning parameter.

DETAILED DESCRIPTION OF THE INVENTION

Figure 1:
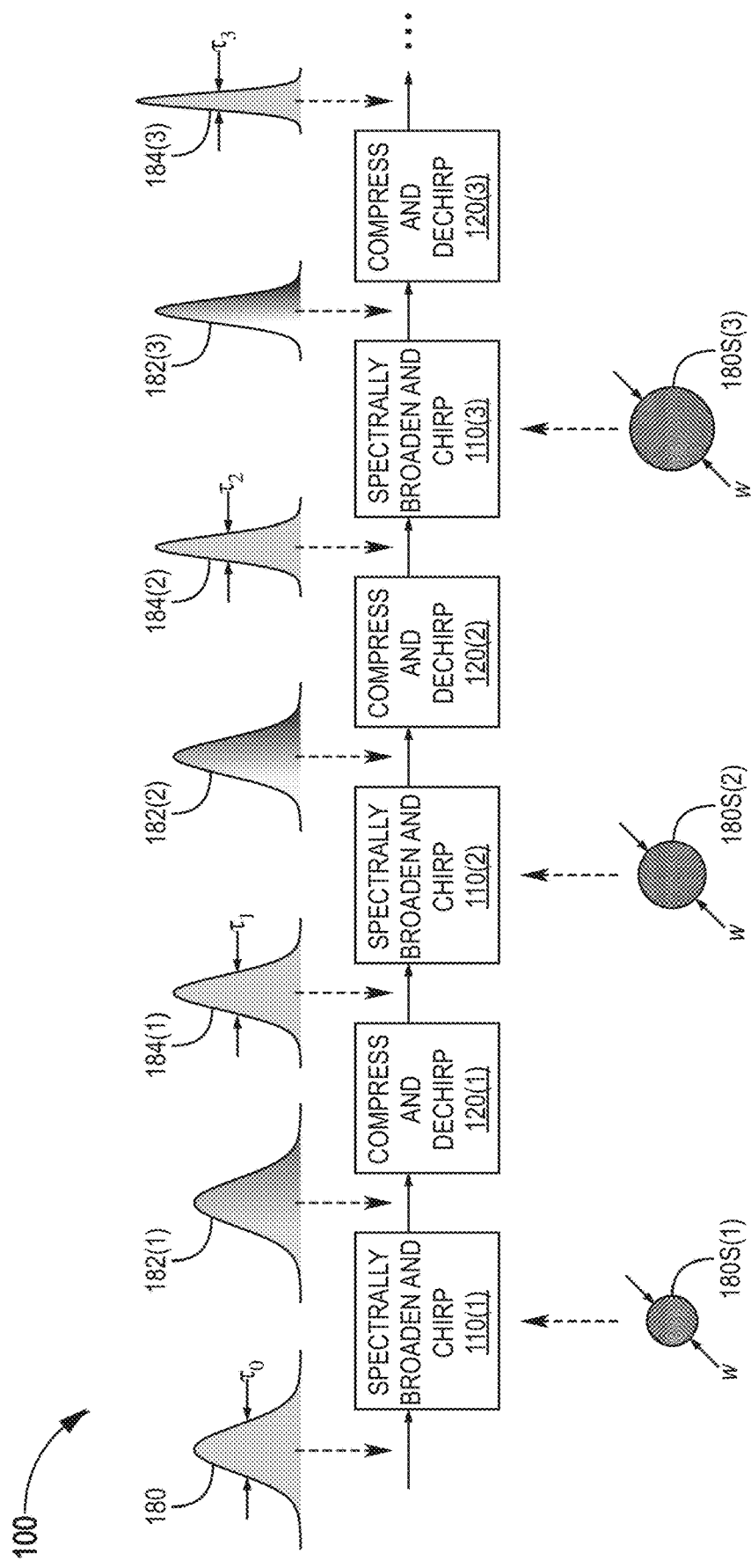
FIG. 1 illustrates a method for compressing an ultrashort pulse of a laser beam, according to an embodiment. The method alternates between steps of spectrally broadening the pulse in one or more broadening bulk-optics and steps of dechirping and temporally compressing the pulse. The method manipulates the size of the laser beam such that the spot size of the ultrashort pulse at the broadening bulk-optic(s) increases for every repetition of the spectrally broadening step.

Referring now to the drawings, wherein like components are designated by like numerals, FIG. 1 illustrates one method 100 for compressing an ultrashort pulse of a laser beam. Method 100 alternates between steps 110 of spectrally broadening the pulse and steps 120 of temporally compressing the pulse. Each instance of step 110 is followed by a corresponding instance of step 120. Step 110 takes place in a broadening bulk-optic, or a set of broadening bulk-optics, by virtue of self-phase modulation. Step 110 introduces a spectral chirp where the instantaneous frequency of the pulse changes over time. For example, the instantaneous frequency of the pulse may increase from its leading end to its trailing end. Step 120 utilizes one or more dispersive optical elements that dechirp the pulse to compress its duration. In one example, step 120 uses a chirped mirror. In another example, step 120 uses a set of prisms. Each pair of steps 110 and 120 cooperate to shorten the pulse duration.

Method 100 receives an ultrashort laser pulse 180 having a pulse duration $\tau_0$ (e.g., a FWHM duration). A first instance of step 110 spectrally broadens laser pulse 180 and thereby generates a chirped laser pulse 182(1), whereafter a first instance of step 120 dechirps chirped laser (1) to produce a temporally compressed laser pulse 184(1) having a shorter pulse duration $\tau_1$. The dechirping in step 120 may fully or only partly compensate for the chirp introduced in step 110. Next, a second repetition of steps 110 and 120 cooperate to form a temporally compressed laser pulse 184(2) having an even shorter pulse duration $\tau_2$. In the example depicted in FIG. 1, method 100 performs at least three repetitions of steps 110 and 120. More generally, method 100 may perform two or more repetitions of steps 110 and 120.

The chirp introduced in step 110 is likely to have some degree of nonlinearity. As compared to an alternative method performing dechirping only after the last one of several passes through the broadening bulk-optic(s), the alternation between steps 110 and 120 in method 100 helps minimize any compounded nonlinearity induced by repeatedly applied spectral broadening. In one embodiment, the dispersive optical element(s), utilized by step 120, are characterized by a linear group delay dispersion. At least in part by virtue of the alternation between steps 110 and 120, this embodiment of method 100 may achieve good temporal compression even when the chirp introduced in step 110 exhibits nonlinearity and/or when the dechirping in step 120 is not perfect.

Method 100 further manipulates the size of the laser beam such that the spot size 180S of the ultrashort pulse at the broadening bulk-optic(s) increases for every repetition of step 110. As illustrated in FIG. 1, the spot size 180S at each non-first repetition of step 110 is greater than the spot size 180S at the preceding iteration of step 110. As discussed above, this increasing spot size 180S enables method 100 to achieve substantial spectral broadening in each iteration of step 110 while keeping the peak intensity below the damage threshold of the broadening bulk-optic(s) and keeping the B-integral below the limit for run-away self-focusing and other, related undesirable outcomes. In one embodiment, the beam-size manipulation of method 100 keeps the B-integral below approximately 2.0 radians (rad) to avoid these undesirable outcomes. We have found that, when the B-integral is kept below 2.0 rad, the final compressed laser pulses, generated by compressor 200, may have a beam quality $M^2$ of less than 2.0. Method 100 may maintain a similar B-integral for each repetition of step 110, so as to maximize the spectral broadening achieved in each repetition of step 110 while staying below the damage threshold and avoiding self-focusing and other related undesirable outcomes. For example, method 100 may keep the multiple B-integrals, respectively associated with the multiple repetitions of step 110, within ±30% of the average B-integral thereof.

Figure 2:
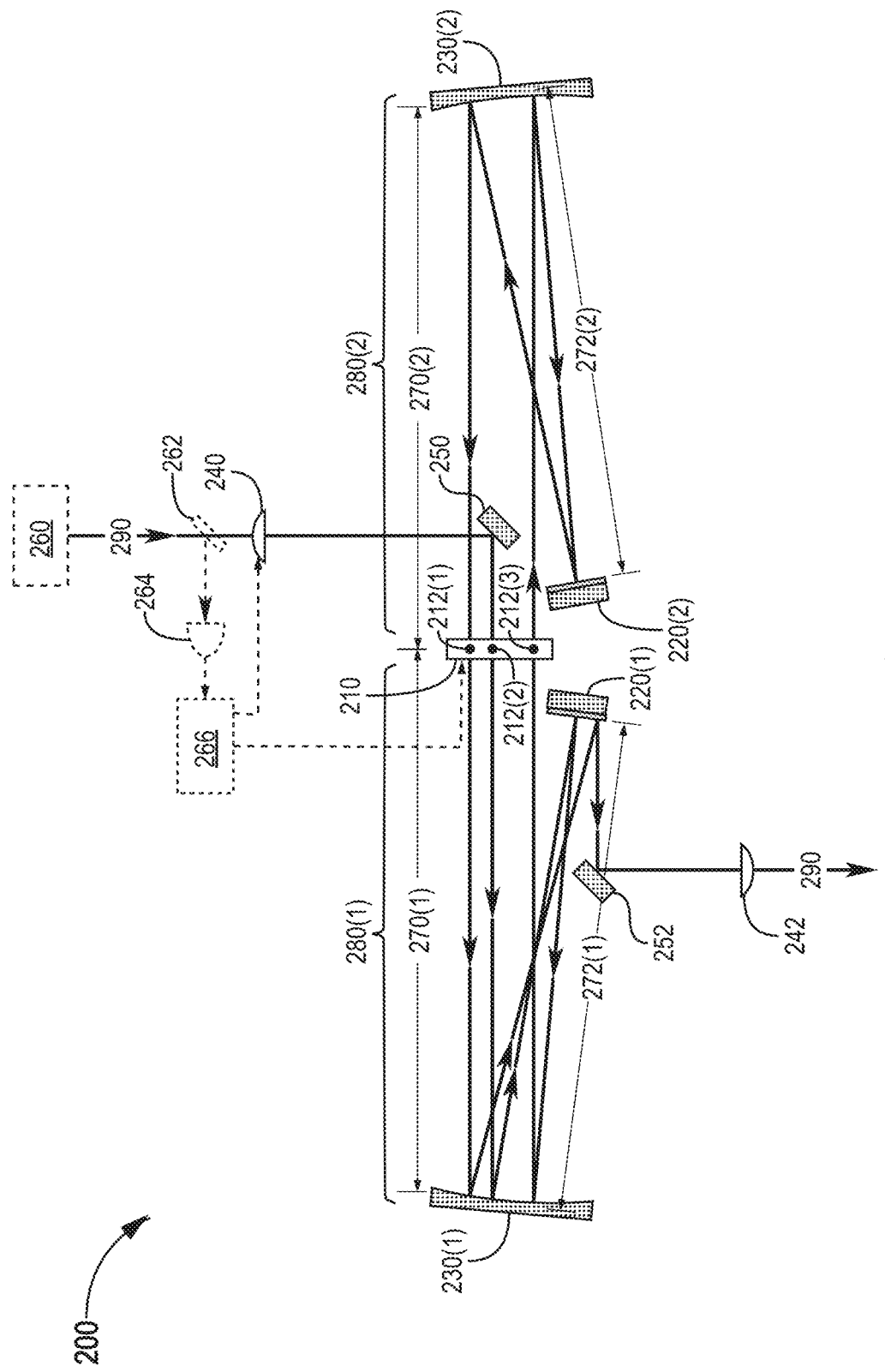
FIG. 2 illustrates a multipass ultrashort-pulse compressor configured to perform the method of FIG. 1, with each repetition of the spectrally broadening step utilizing the same broadening bulk-optic or the same set of broadening bulk-optics, according to an embodiment.

FIG. 2 illustrates one multipass ultrashort-pulse compressor 200 configured to perform method 100, with each repetition of step 110 utilizing the same broadening bulk-optic or the same set of broadening bulk-optics. Compressor 200 includes a broadening bulk-optic 210 (or, alternatively, a set of broadening bulk-optics 210), two chirped mirrors 220, and two concave mirrors 230 with positive optical power. Chirped mirrors 220 are end mirrors of a multipass arrangement that is folded by concave mirrors 230 and contains broadening bulk-optic(s) 210. Compressor 200 receives a laser beam 290 of ultrashort pulses. Laser beam 290 then passes through broadening bulk-optic(s) 210 several times while traveling between chirped mirrors 220. Concave mirror 230(1) folds the propagation path in a first leg 280(1) of the multipass arrangement between broadening bulk-optic(s) 210 and chirped mirror 220(1), and concave mirror 230(2) folds the propagation path in a second leg 280(2) of the multipass arrangement between broadening bulk-optic(s) 210 and chirped mirror 220(2). Chirped mirrors 220 have no or only insignificant optical power. In one embodiment, chirped mirrors 220 are planar mirrors. Chirped mirrors 220(1) and 220(2) may be a matched pair with mutually cancelling group-delay-dispersion ripples, at least to a good approximation, so as to optimize the dechirping and resulting temporal compression. Each chirped mirror 220 may be characterized by a linear group delay dispersion.

Broadening bulk-optic(s) 210 is (are), for example, made of sapphire, fused silica, yttrium-aluminum garnet (YAG), or calcium fluoride ($CaF_2$). The wavelength of laser beam 290 may be between 700 and 1100 nanometers (nm). In one scenario, laser beam 290, as first received by compressor 200, is generated using a ytterbium doped gain medium (e.g., using a Yb:YAG laser) and has a center wavelength of about 1030 nm. In this scenario, laser beam 290 may be characterized by a pulse energy in the range between 10 microJoules (µJ) and a few milliJoules (mJ) and a pulse duration in the range between 500 and 1000 femtoseconds (fs). In another scenario, laser beam 290, as first received by compressor 200, is generated using a titanium-sapphire gain medium and has a center wavelength of about 800 nm. In this scenario, laser beam 290 may be characterized by a pulse energy in the range between 0.1 and 1 mJ and a pulse duration of less than 100 fs, for example between 5 and 50 fs. Laser beam 290 may be linearly or circularly polarized.

In the embodiment depicted in FIG. 2, compressor 200 includes mirrors 250 and 252. Mirror 250 couples laser beam 290 into the multipass arrangement by directing laser beam 290 onto a propagation path that makes the several passes through broadening bulk-optic(s) 210 before being intercepted and ejected from the multipass arrangement by mirror 252. The placement of mirrors 250 and 252 may differ from that shown in FIG. 2, for example to accommodate an even number of passes through broadening bulk-optic(s) 210. As will be understood by a person of ordinary skill in the art, other schemes for coupling laser beam 290 into the multipass arrangement and ejecting laser beam 290 from the multipass arrangement are possible. For example, laser beam 290 may enter or leave the multipass arrangement via an opening in one of concave mirrors 230, or laser beam 290 may enter or leave the multipass arrangement along a propagation path that passes by one of concave mirrors 230 with no need for deflection by an additional beam steering mirror.

Each pass of laser beam 290 through broadening bulk-optic(s) 210 corresponds to a respective repetition of spectral-broadening step 110 of method 100. After each pass through broadening bulk-optic(s) 210, one of chirped mirrors 220 reflects laser beam 290. Each such reflection corresponds to a respective repetition of dechirping and temporal-compression step 120 of method 100. Whereas the same broadening bulk-optic 210 (or the same set of broadening bulk-optic(s) 210) performs each repetition of step 110, chirped mirrors 220(1) and 220(2) alternately perform step 120.

Between each pair of subsequent passes through broadening bulk-optic(s) 210, one of concave mirrors 230 focuses laser beam 290 to increase its spot size at the next pass through broadening bulk-optic(s) 210, until laser beam 290 is ejected from the multipass arrangement. In each leg 280, the optical power of concave mirror 230 cooperates with distance 270, from concave mirror 230 to broadening bulk-optic(s) 210, and distance 272, from concave mirror 230 to an associated chirped mirror 220, to cause the spot size of laser beam 290 at broadening bulk-optic(s) 210 to be greater for each successive pass through broadening bulk-optic(s) 210. Herein, each of distances 270 and 272 is measured along the propagation path of laser beam 290. The segments of the propagation path, associated with a distance 270 or a distance 272, may be straight (as depicted) or have folds not shown in FIG. 2.

While FIG. 2 depicts an embodiment configured for three passes 212(1-3) of laser beam 290 through broadening bulk-optic(s) 210, compressor 200 may be configured for a different number of passes (two, four, or more) through broadening bulk-optic(s) 210, without departing from the scope hereof. The optimum number of passes depends on several factors. For example, a certain compression factor may, at least in principle, be achieved with relatively low B-integrals when the number of passes is relatively high. On the other hand, each pass is likely associated with some loss (e.g., 1-5%), and each additional pass adds alignment complexity. It may therefore, at least in some scenarios, be favorable to keep the number of passes to no more than 15, 10, or even 5.

Compressor 200 may be configured to receive laser beam 290 as a collimated laser beam. For this purpose, compressor 200 may include a lens 240 (or a collection of lenses, for example including a telescope) that focuses laser beam 290 onto broadening bulk-optic(s) 210. Similarly, compressor 200 may include a lens 242 (or a collection of lenses) that collimates laser beam 290 after ejection from the multipass arrangement. In addition, laser beam 290 does not need to follow the exact propagation path drawn in FIG. 2. For example, passes 212 may be offset from each other in the dimension orthogonal to the plane of FIG. 2 rather than within the plane of FIG. 2.

Compressor 200 may be integrated in a laser apparatus that further includes an ultrashort-pulse laser source 260 generating laser beam 290.

In one embodiment of compressor 200, referred to as the near-imaging-condition embodiment, the propagation path length between successive passes through broadening bulk-optic(s) 210 is 2(2f+x) in each leg 280. Here, f is the focal length of the instance of concave mirror 230 located in the respective leg 280, and x is a non-zero detuning parameter that may be negative or positive. The absolute value of x is less than 0.1f. A propagation path length of 4f (corresponding to x=0) would correspond to concave mirror 230 imaging the spot size of laser beam 290 at one pass through broadening bulk-optic(s) 210 onto the next pass through broadening bulk-optic(s) 210, such that the spot size remains the same for sequential passes. In the near-imaging-condition embodiment, the propagation path length between successive passes through broadening bulk-optic(s) 210 is slightly detuned from 4f such that the spot size at broadening bulk-optic(s) 210 increases as a function of pass number, as indicated in FIG. 1.

The propagation path length between successive passes through broadening bulk-optic(s) 210 alternates between (a) approximately twice the sum of distances 270(1) and 272(1) in leg 280(1) and (b) approximately twice the sum of distances 270(2) and 272(2) in leg 280(2). In a symmetric implementation of the near-imaging-condition embodiment, concave mirrors 230(1) and 230(2) have the same focal length f, distances 270(1) and 270(2) are identical, and distances 272(1) and 272(2) are identical. In one asymmetric implementation, concave mirrors 230(1) and 230(2) have the same focal length f, but the detuning parameter x in leg 280(1) is different from the detuning parameter x in leg 280(2) due to a difference between distances 270(1) and 270(2) and/or a difference between distances 272(1) and 272(2). In another asymmetric implementation, concave mirrors 230(1) and 230(2) have different focal lengths $f_1$ and $f_2$. In this asymmetric implementation, the ratio of the detuning parameter to the focal length may be the same in legs 280(1) and 280(2) or differ between legs 280(1) and 280(2). The performance of these symmetric and asymmetric implementations is similar, in terms of pulse compression. However, other considerations, such as spatial constraints, may deem one of these implementations advantageous over the others.

In one example of the near-imaging-condition embodiment, the detuning is implemented between broadening bulk-optic(s) 210 and concave mirrors 230. In this example, distance 270 is f+x, and distance 272 is f, in each leg 280. This configuration results in concave mirror 230 and chirped mirror 220, in each leg 280, forming an imaging system with unity magnification, which may simplify the process of designing compressor 200 as compared to when all or part of the detuning is implemented in distance 272. As discussed above, the two legs 280 may be configured with different values of f and/or x.

FIGS. 3A and 3B illustrate in cross section the transverse profile 300 of laser beam 290 (shaded) when propagating through one example of the near-imaging-condition embodiment of compressor 200 with a positive detuning parameter x. In this example, legs 280(1) and 280(2) are identical, and the detuning is implemented in the segments between broadening bulk-optic(s) 210 and concave mirrors 230, such that distances 270(1) and 270(2) are f+x and distances 272(1) and 272(2) are f. FIG. 3A shows transverse profile 300 of laser beam 290 from entry into compressor 200 through three passes through broadening bulk-optic(s) 210. FIG. 3A schematically indicates the locations, along the propagation path of laser beam 290, of broadening bulk-optic(s) 210, chirped mirrors 220, concave mirrors 230, and a telescope 350. Telescope 350 is an embodiment of lens 240. FIG. 3B shows the equivalent cross sections of laser beam 290 that concave mirrors 230 image onto successive passes through broadening bulk-optic(s) 210. For simplicity, FIGS. 3A and 3B do not take into consideration potential focusing imparted by Kerr-effect lensing in broadening bulk-optic(s) 210. Each of FIGS. 3A and 3B indicates a longitudinal axis 394 of laser beam 290. In each of FIGS. 3A and 3B, transverse profile 300 may correspond to the $1/e^2$ diameter of laser beam 290. Detuning parameter x and the resulting increase in spot size 380 for successive passes through broadening bulk-optic(s) 210, indicated in FIG. 3A, are exaggerated for clarity.

Telescope 350 demagnifies laser beam 290 in broadening bulk-optic(s) 210 for a first pass with a spot size 380(1). Laser beam 290 forms a waist at this first pass through broadening bulk-optic(s) 210. After the first pass through broadening bulk-optic(s) 210, laser beam 290 propagates a distance f+x to concave mirror 230(1). Since the distance f+x exceeds the focal length f, the two reflections by concave mirror 230(1) causes laser beam 290 to form a waist before the second pass through broadening bulk-optic(s) 210. This waist is an image of the original waist of laser beam 290 in the first pass through broadening bulk-optic(s) 210, and therefore has spot size 380(1). (Chirped mirror 220 does not affect the focusing properties of laser beam 290.) Laser beam 290 then diverges before reaching broadening bulk-optic(s) 210 again for a second pass. Consequently, the spot size 380(2) of laser beam 290 at the second pass through broadening bulk-optic(s) 210 is greater than spot size 380(1). Concave mirror 230(2) repeats this behavior for the third pass through broadening bulk-optic(s) 210, such that the spot size 380(3) at the third pass exceeds spot size 380(2). In embodiments of compressor 200 configured for more than three passes through broadening bulk-optic(s) 210, the increase in spot size 380 at broadening bulk-optic(s) 210 continues for each additional pass.

FIG. 3B shows caustic 392 of laser beam 290 at the first pass through broadening bulk-optic(s) 210, as defined by telescope 350. The shaded part of caustic 392 indicates the portion of caustic 392 that matches transverse profile 300, and dashed lines indicate the extrapolation of caustic 392 into regions where other optical elements of the compressor cause transverse profile 300 to deviate from caustic 392. Caustic 392 has a waist with spot size 380(1). The subsequent two reflections by concave mirror 230(1) image a cross section of caustic 392, a distance 2x downstream from the waist, onto the second pass through broadening bulk-optic(s) 210. This cross section has spot size 380(2). Next, the two reflections by concave mirror 230(2) image a cross section of caustic 392, a distance 4x downstream from the waist, onto the third pass through broadening bulk-optic(s) 210. This cross section has spot size 380(3).

FIG. 4 shows the equivalent cross sections of laser beam 290 that concave mirrors 230 image onto successive passes through broadening bulk-optic(s) 210, when detuning parameter x is negative. In this case, distance f+x is less than the focal length f of concave mirrors 230. Therefore, the cross sections of laser beam 290, imaged onto broadening bulk-optic(s) 210 by concave mirrors 230, are upstream of the waist of caustic 392. Specifically, the second pass through broadening bulk-optic(s) 210 corresponds to a cross section of caustic 392 that is a distance 2x upstream from the waist and has spot size 380(2), and the third pass through broadening bulk-optic(s) 210 corresponds to a cross section that is a distance 4x upstream from the waist and has spot size 380(3).

In a modification of compressor 200, the pair of concave mirrors 230 is replaced by a pair of lenses with the same focusing power as concave mirrors 230 and located in the same places as concave mirrors 230. In this modification, the multipass arrangement is linear rather than folded. The folded arrangement is, however, more compact, which may be beneficial in many practical implementations subject to spatial constraints. The replacement of concave mirrors 230 with lenses does not alter the transverse profile of laser beam 290 as it propagates through the compressor.

FIGS. 5A-F illustrate simulated properties of an alternative compressor configured at the imaging condition, corresponding to detuning parameter x being zero. In contrast to compressor 200, the compressor addressed by FIGS. 5A-F is, by virtue of zero detuning, configured to maintain the same spot size at each pass through broadening bulk-optic(s) 210. Otherwise, this compressor is similar to compressor 200.

Figure 5A:
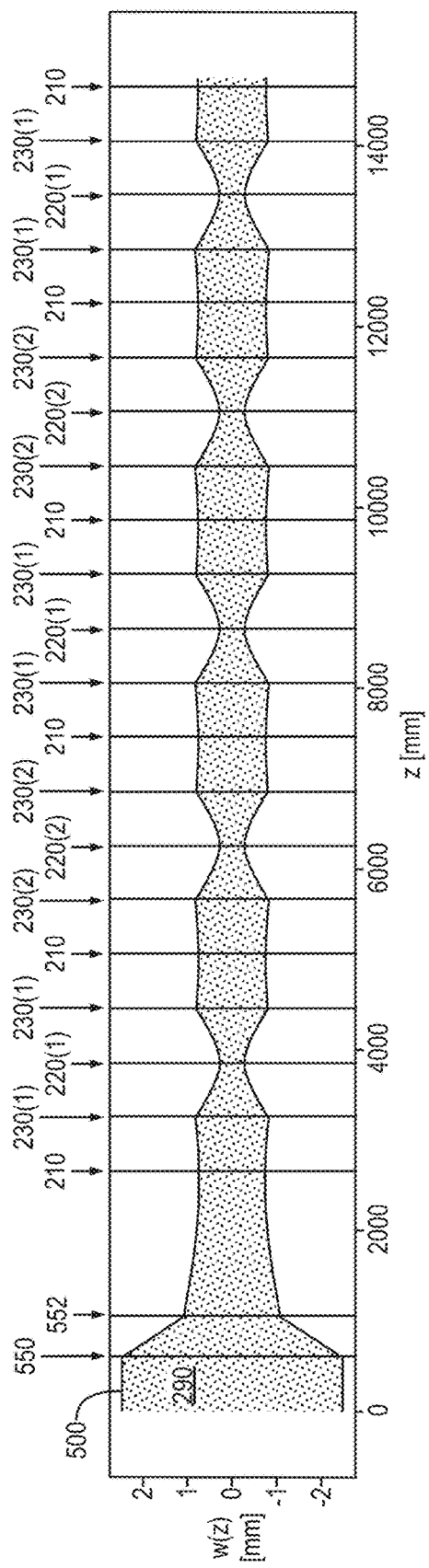
FIGS. 5A-F illustrate simulated properties of an alternative compressor configured at the imaging condition, corresponding to the detuning parameter being zero.
Figure 5B:
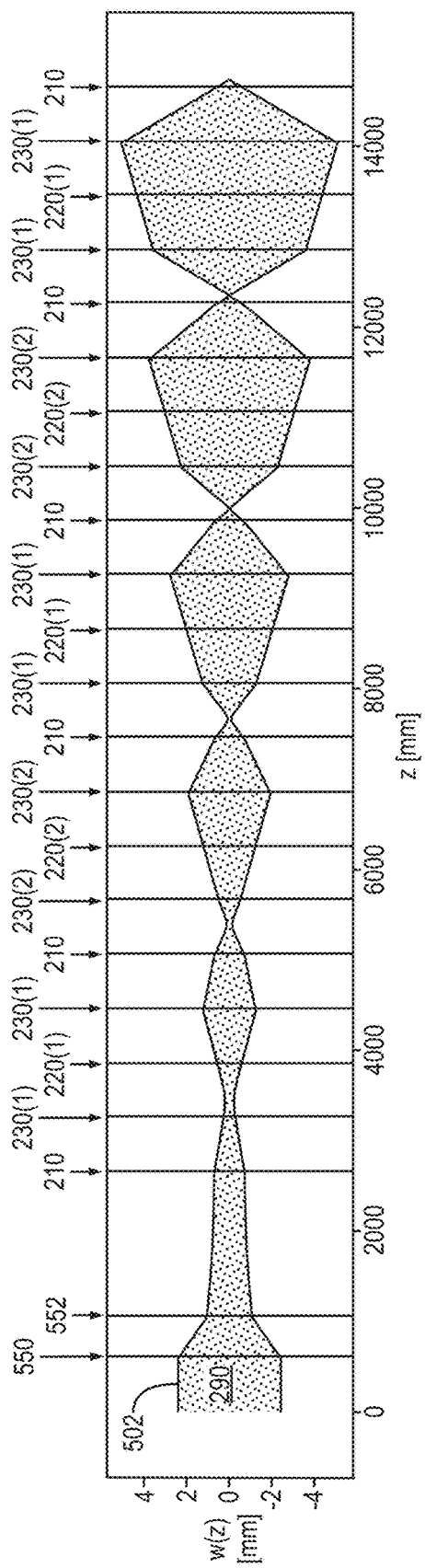

FIG. 5A shows the transverse profile 500 of laser beam 290 from entry into the compressor through six passes through broadening bulk-optic(s) 210, disregarding any Kerr-effect lensing in broadening bulk-optic(s) 210. FIG. 5B shows the transverse profile 502 of laser beam 290 from entry into the compressor through six passes through broadening bulk-optic(s) 210, with Kerr lensing in broadening bulk-optic(s) 210 taken into account. Each of FIGS. 5A and 5B schematically indicates the positions of broadening bulk-optic(s) 210, chirped mirrors 220, and concave mirrors 230.

Figure 5C:
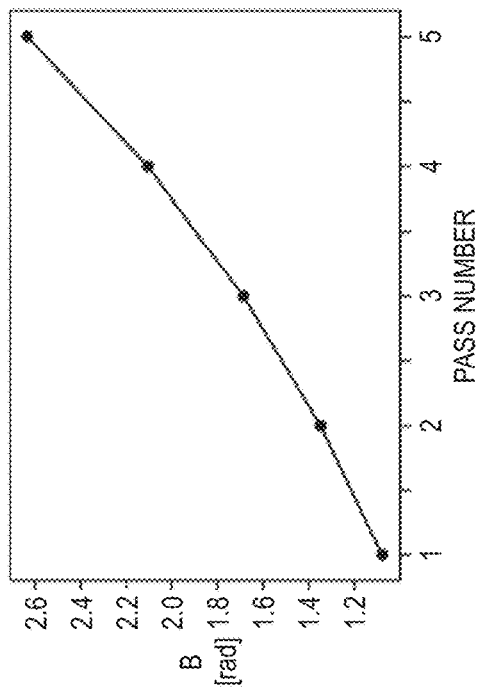
Figure 5D:
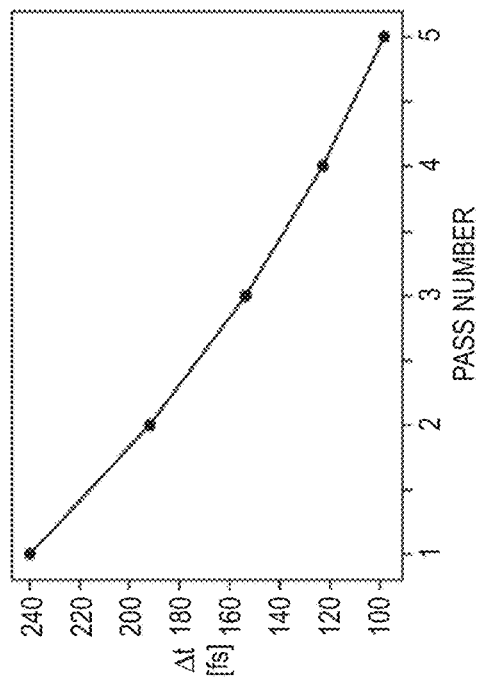
Figure 5E:
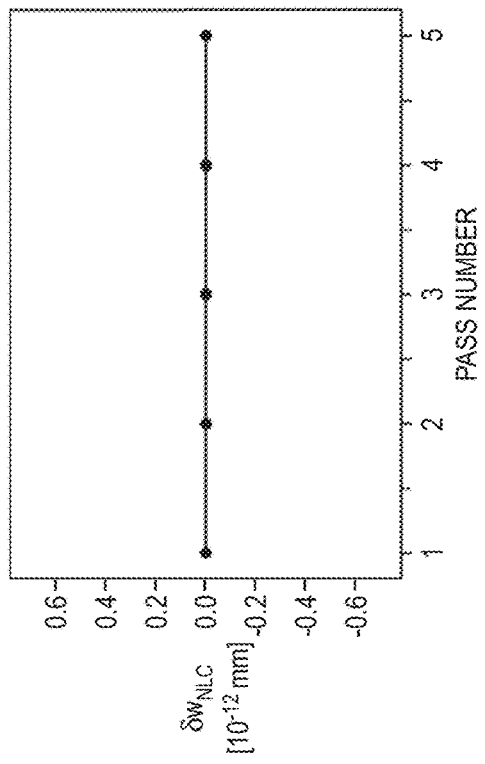
Figure 5F:
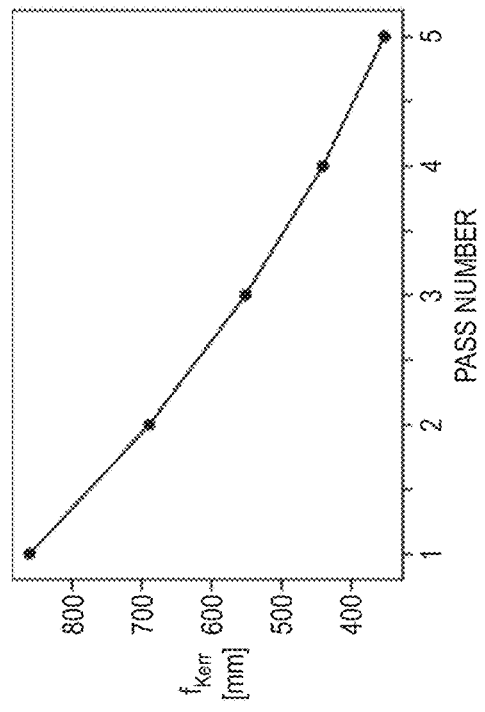

FIGS. 5C-F pertain to the case where Kerr lensing is taken into account, and plot respective parameters for five successive passes through broadening bulk-optic(s) 210. FIG. 5C plots the $1/e^2$ beam radius at broadening bulk-optic(s) 210 in terms of its deviation $\delta w_{NLC}$ from the beam radius at the first pass through broadening bulk-optic(s) 210. FIG. 5D plots the B-integral of the beam in broadening bulk-optic(s) 210. FIG. 5E plots the focal length $f_{Kerr}$ of the Kerr lens induced in broadening bulk-optic(s) 210. FIG. 5F plots the pulse duration $\Delta t$ after dechirping and compression by chirped mirrors 220.

FIGS. 5A-F are all based on an example where the focal length f of concave mirrors 230 is 150 millimeters (mm), each distance 272 is 150 mm, the pulse energy of laser beam 290 is 2 mJ, the input pulse duration of laser beam 290 is 300 femtoseconds, the wavelength of laser beam 290 is 1030 nm, broadening bulk-optic(s) 210 have a nonlinear refractive index of $3 \times 10^{-16}$ centimeters squared per watt ($cm^2/W$) and a total thickness at each pass of 0.9 mm, and the pulse shortening factor per pass (after dechirping) is assumed to be 0.8. The pulse shortening factor is defined as the ratio of (a) the pulse duration after the pass (and after subsequent dechirping) to (b) the pulse duration before the pass.

Referring first to FIG. 5A, a pair of telescope lenses 550 and 552 form a waist in laser beam 290 where laser beam 290 is incident on broadening bulk-optic(s) 210 for the first pass therethrough. Laser beam 290 makes its first pass through broadening bulk-optic(s) 210, propagates a distance f to concave mirror 230(1), a distance f to chirped mirror 220(1), a distance f back to concave mirror 230(1), and then a distance f to broadening bulk-optic(s) 210. These propagation distances, a total of 4f, match the imaging condition. Laser beam 290 therefore forms a waist again where laser beam 290 is incident on broadening bulk-optic(s) 210 for the second pass therethrough, with the waist size at the second pass being the same as at the first pass. This evolution of transverse profile 500 repeats between each pair of successive passes through broadening bulk-optic(s) 210, such that the size of laser beam 290 is the same each time laser beam 290 encounters broadening bulk-optic(s) 210.

Referring now to FIG. 5B, Kerr lensing in broadening bulk-optic(s) 210 affects the evolution of transverse profile 502. As compared to transverse profile 500, the Kerr lens focuses laser beam 290, such that laser beam 290 converges rather than diverges when leaving broadening bulk-optic(s) 210. Between each pair of successive passes through broadening bulk-optic(s) 210, laser beam 290 forms a waist after the preceding pass through broadening bulk-optic(s) 210 and attains a largest size at the second encounter of concave mirror 230 before the next pass through broadening bulk-optic(s) 210. As laser beam 290 propagates through the compressor, the waist size decreases and the largest size increases. However, because concave mirrors 230 are arranged at the imaging condition, concave mirrors 230 still image the same beam size onto broadening bulk-optic(s) 210 at each pass, despite the effect of Kerr lensing. This is evidenced by FIG. 5C, which shows that the spot size at broadening bulk-optic(s) 210 is the same for each pass. Because the spot size at broadening bulk-optic(s) 210 remains the same for each pass, the B-integral increases (see FIG. 5D) and the Kerr focal length decreases (see FIG. 5E) for successive passes. The B-integral grows from approximately 1.1 rad at the first pass to more than 2.0 rad already at the fourth pass, and this growth accelerates for successive passes. As the B-integral increases beyond about 2.0 rad, undesirable effects, such as run-away self-focusing, filamentation, and damage to the optical elements, tend to occur. Additionally, as the pulse duration decreases (see FIG. 5F), the peak intensity may approach or exceed the damage threshold.

FIGS. 6A-E illustrate simulated properties of one near-imaging-condition embodiment of compressor 200, characterized by a non-zero detuning parameter x. FIGS. 6A-E demonstrate the advantage of the spot size increase that takes place when operating slightly detuned from the imaging condition. FIGS. 6A-E pertain to an example of compressor 200 that is identical to the compressor of FIGS. 5A-F except for being configured with a detuning parameter x of −40 mm, corresponding to a relative detuning |x|/f of 0.067.

Figure 6A:
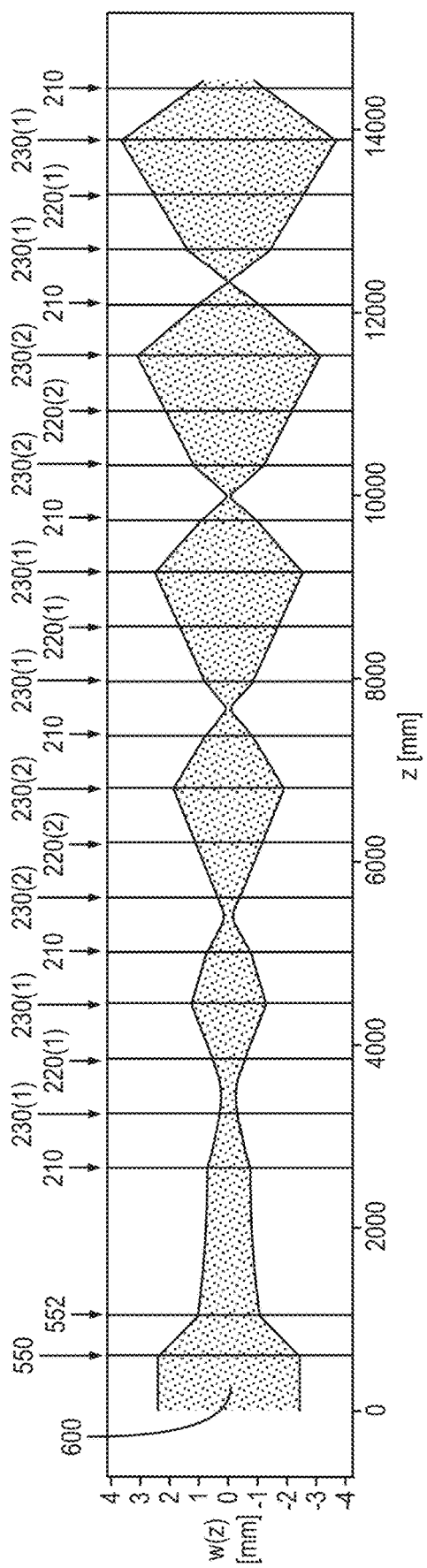
FIGS. 6A-E illustrate simulated properties of a near-imaging-condition embodiment of the compressor of FIG. 2 characterized by a non-zero detuning parameter.
Figure 6C:
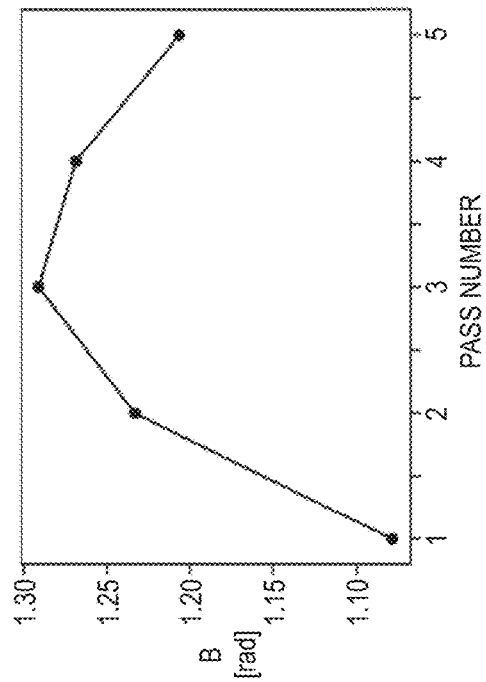
Figure 6B:
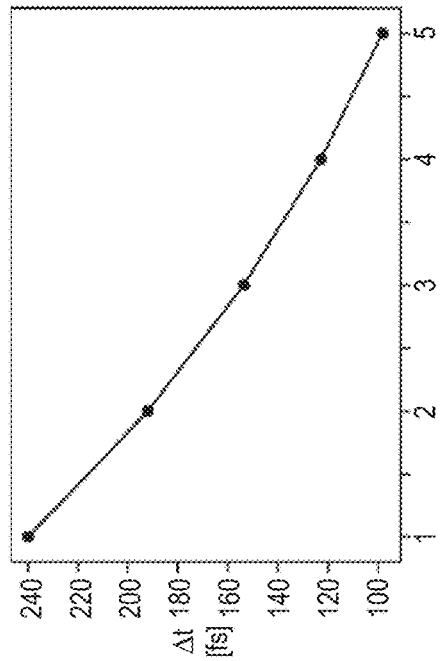
Figure 6E:
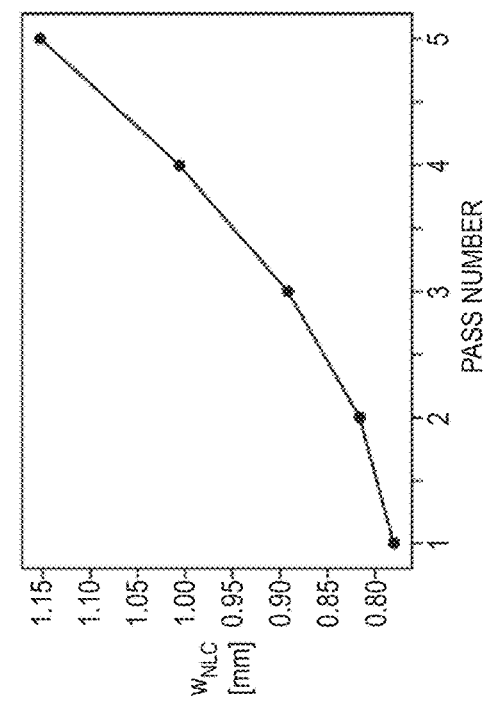
Figure 6D:
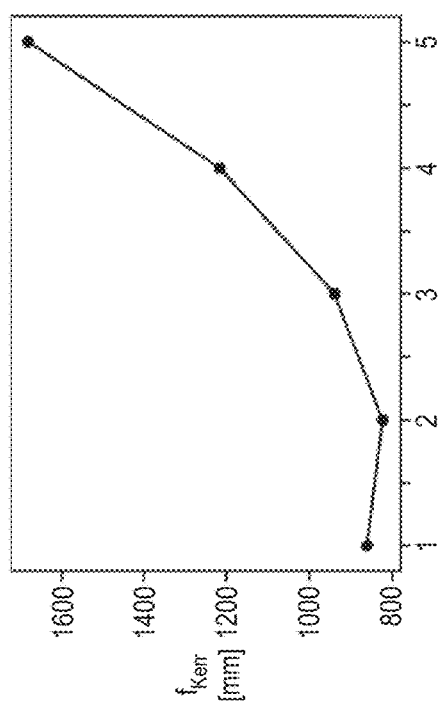

FIG. 6A is a plot similar to that of FIG. 5B and shows the transverse profile 600 of laser beam 290 from entry into compressor 200 through six passes through broadening bulk-optic(s) 210, with Kerr-effect lensing in broadening bulk-optic(s) 210 taken into account. FIGS. 6B-E plot respective parameters for five successive passes through broadening bulk-optic(s) 210. FIG. 6B plots the $1/e^2$ beam radius $w_{NLC}$ at broadening bulk-optic(s) 210. FIG. 6C plots the B-integral. FIG. 6D plots the focal length $f_{Kerr}$ of the Kerr lens induced in broadening bulk-optic(s) 210. FIG. 6E plots the pulse duration Δt after dechirping and compression by chirped mirrors 220.

Transverse profile 600 may at a first glance appear quite similar to transverse profile 502 of FIG. 5A. However, by virtue of the detuning from imaging condition, the spot size at broadening bulk-optic(s) 210 increases for each pass (see FIG. 6B). As a consequence, the B-integral has a maximum value of less than 1.3 and actually decreases after the third pass. Related hereto, the Kerr focal length increases after the second pass. A B-integral of less than 1.3 is far less likely to lead to the undesirable effects mentioned above, such as run-away self-focusing, filamentation, and damage to the optical elements. The average B-integral, over the five passes, is approximately 1.0, and each of the five B-integrals is within approximately 20% of this average value. In addition, the increase in the spot size (see FIG. 6B) may prevent the peak intensity from approaching or exceeding the damage threshold when the pulse duration decreases (see FIG. 6E).

FIGS. 6A-E pertain to just one example of a near-imaging-condition embodiment of compressor 200. Similarly advantageous properties, or even more advantageous properties, may be achieved with other parameters. For example, the thickness of broadening bulk-optic(s) 210 may be decreased to operate with lower B-integrals. Additionally, the number of passes may be decreased or increased as needed to achieve a certain overall pulse compression.

Figure 7A:
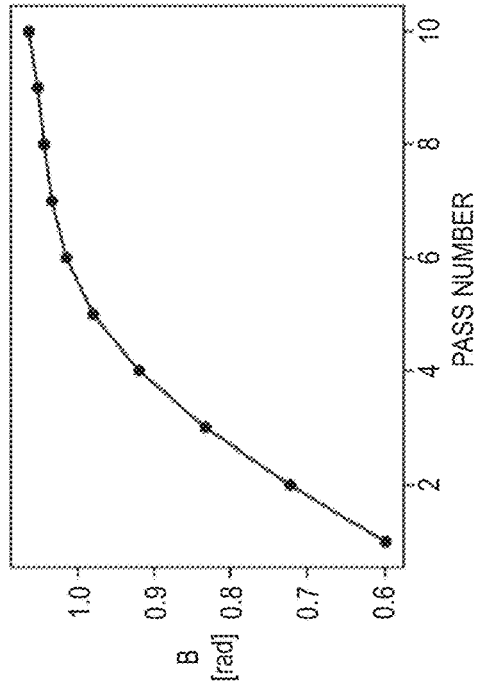
FIGS. 7A-D illustrate simulated properties of another near-imaging-condition embodiment of the compressor of FIG. 2 characterized by a non-zero detuning parameter.
Figure 7B:
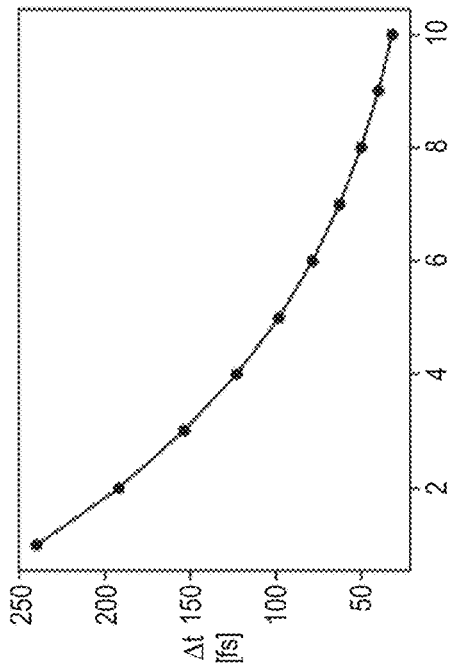
Figure 7C:
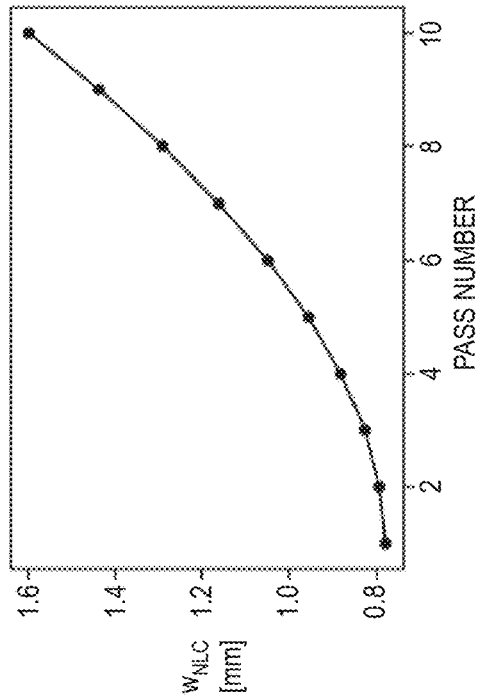
Figure 7D:
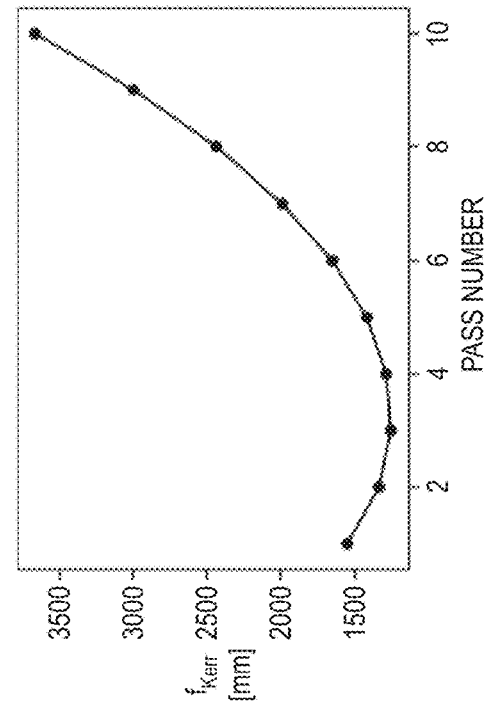

FIGS. 7A-D illustrate simulated properties of another near-imaging-condition embodiment of compressor 200, characterized by a non-zero detuning parameter x. The FIGS. 7A-D embodiment is identical to the FIGS. 6A-E embodiment except that the thickness of broadening bulk-optic(s) 210 is reduced from 0.9 mm to 0.5 mm. FIGS. 7A-D plot respective parameters for ten successive passes through broadening bulk-optic(s) 210. FIG. 7A plots the $1/e^2$ beam radius $w_{NLC}$ at broadening bulk-optic(s) 210. FIG. 7B plots the B-integral. FIG. 7C plots the focal length $f_{Kerr}$ of the Kerr lens induced in broadening bulk-optic(s) 210. FIG. 7D plots the pulse duration Δt after dechirping and compression by chirped mirrors 220.

The reduction in the thickness of broadening bulk-optic(s) 210 at least initially results in a reduction of the B-integral and an increase of the Kerr focal length, because both the B-integral and the power of the Kerr lens are proportional to the thickness of broadening bulk-optic(s) 210. However, the Kerr focal length associated with one pass through broadening bulk-optic(s) 210 affects the spot size at the next pass, and the overall impact of the thickness reduction is therefore not a simple scaling. As seen by comparing FIG. 7A to FIG. 6B, the growth of the spot size at broadening bulk-optic(s) 210, as a function of pass number, is slower when the thickness is reduced. In the FIGS. 7A-D embodiment, the Kerr focal length takes on a minimum value of approximately 1300 mm at the third pass and then increases for each subsequent one of the ten passes. The B-integral is approximately 0.6 rad at the first pass through broadening bulk-optic(s) 210, increases to almost 1.0 rad at the fifth pass, whereafter the increase slows to keep the B-integral to less than 1.1 rad for the remaining five passes. The B-integral averages approximately 0.92 rad, and each of the ten B-integrals are within 25% of the average value.

The results of FIGS. 7A-D also serve as an illustration of the impact of a decrease in pulse energy. The B-integral is, at least to a good approximation, proportional to both the thickness of broadening bulk-optic(s) 210 and the peak intensity of laser beam 290. The power of the Kerr lens is proportional to both the thickness of broadening bulk-optic(s) 210 and the peak power of laser beam 290. Therefore, a decrease in pulse energy by a certain factor has at least approximately the same impact as a decrease in thickness by the same factor.

Addressing now specifically the spot size increase as a function of pass number, the results shown in FIGS. 6A-E and FIGS. 7A-D demonstrate, by example, that concave mirrors 230 and the relatively small detuning parameter x reduce the sensitivity of near-imaging-condition embodiments of compressor 200 to changes in pulse energy. FIG. 6B shows an increase in spot size by about 5% from the first to the second pass, and an increase by about 50% from the first to the fifth pass. FIG. 7A shows an increase in spot size by about 2.5% from the first to the second pass, and an increase by about 20% from the first to the fifth pass. In both cases, the spot size increase is steady but not dramatic. Additionally, the difference in the spot size growth rate, as a function of pass, between FIG. 6B and FIG. 7A is noticeable but not drastic, despite the thickness reduction by almost 50% being equivalent to a decrease in pulse energy by almost 50%. In contrast, consider a multipass compressor that does not include concave mirrors 230 but instead relies solely on the Kerr lens induced in broadening bulk-optic(s) 210 to maintain a relatively similar spot size for each pass (with the laser beam forming a waist between each pass). In this non-imaging compressor, a decrease in Kerr focal length by about 50%, due to a pulse energy change, would result in the spot size approximately tripling between the first pass and the second pass rather than staying relatively similar. Thus, in the near-imaging-condition embodiment of compressor 200, concave mirrors 230 have a strong stabilizing effect, rendering the near-imaging-condition embodiment of compressor 200 relatively insensitive to changes in pulse energy. Furthermore, as will be discussed in the following, compressor 200 may be implemented with a pair of broadening bulk-optic(s) having adjustable combined thickness, which may be used to compensate for variation in pulse energy.

Figure 8B:
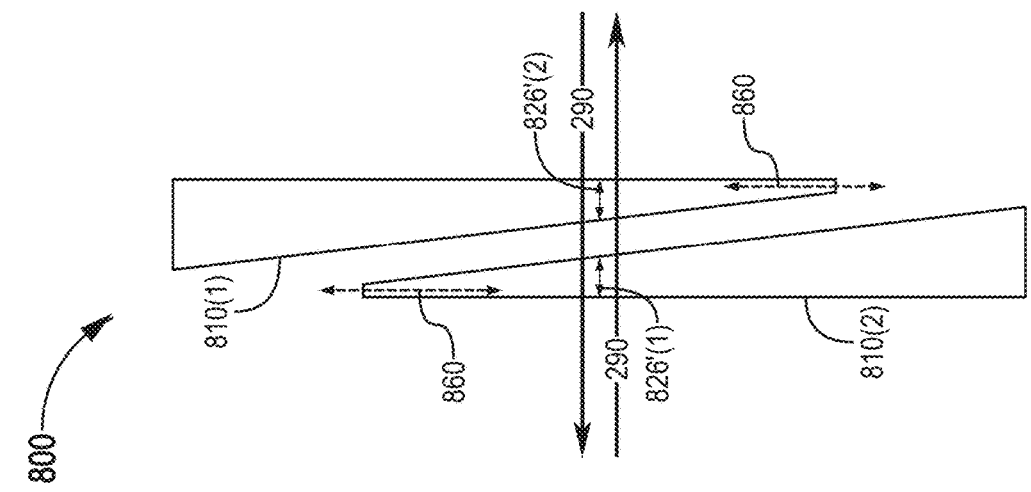
FIGS. 8A and 8B illustrate a broadening bulk-optic pair including two wedge-shaped broadening bulk-optics having a combined thickness that is adjustable by changing positions of the wedge-shaped broadening bulk-optics relative to each other, according to an embodiment.
Figure 8A:
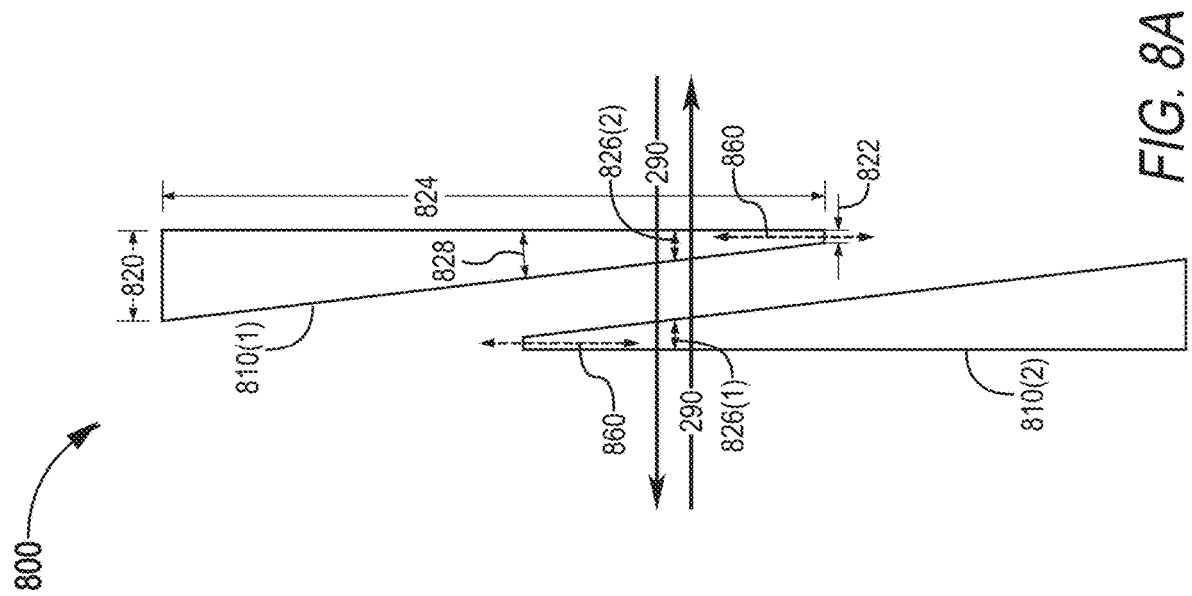

FIGS. 8A and 8B illustrate one broadening bulk-optic pair 800 including two wedge-shaped broadening bulk-optics 810 having a combined thickness that is adjustable by changing positions of the wedge-shaped broadening bulk-optics relative to each other. Broadening bulk-optic pair 800 is an embodiment of broadening bulk-optic(s) 210. Each broadening bulk-optic 810 has a thicker end with thickness 820 and a thinner end with thickness 822, and a length 824 between the thinner and thicker ends. Each of broadening bulk-optics 810 intersect laser beam 290, such that laser beam 290 experiences the combined thickness of broadening bulk-optics 810 for each pass. One or both of broadening bulk-optics 810 are moveable along directions 860, such that the combined thickness is adjustable.

FIGS. 8A and 8B depict two example configurations with relatively smaller and larger combined thicknesses, respectively. Laser beam 290 experiences the combination of thicknesses 826(1) and 826(2) in the FIG. 8A configuration. In FIG. 8B, broadening bulk-optics 810 have been moved more toward each other, such that laser beam 290 experiences the combination of larger thicknesses 826'(1) and 826'(2).

Although not shown in FIGS. 8A and 8B, broadening bulk-optic pair 800 may be incorporated in an assembly that includes translation stages to translate broadening bulk-optics 810 along directions 860. The translation stages may be motorized. Embodiments of compressor 200 implementing broadening bulk-optic pair 800 may be configured to actively adjust the relative positions of broadening bulk-optics 810 in response to changes in, e.g., pulse energy, so as to stabilize the performance of compressor 200 in the presence of such changes.

Each broadening bulk-optic 810 has a wedge angle 828. Wedge angle 828 may be in the range between 2 and 10 degrees, and/or may be set to provide a desired clear aperture size while maintaining a manufacturable thickness 822 (e.g., 0.3 mm or more) at the thinner end. In one example, the combined thickness of broadening bulk-optic pair 800 is adjustable between a smaller combined thickness of about 0.5-1.0 mm and a larger combined thickness of 8-10 mm. The extent of broadening bulk-optics 810 orthogonal to the plane of FIGS. 8A and 8B may be set to accommodate several non-overlapping passes of laser beam 290 offset from each other in the dimension orthogonal to the plane of FIGS. 8A and 8B. In one example, the extent of broadening bulk-optics 810 orthogonal to the plane of FIGS. 8A and 8B is at least 30 mm, for example between 30 and 60 mm. Broadening bulk-optics 810 may have an anti-reflective coating. In addition, for a small wedge angle 828, broadening bulk-optic pair 800 may be implemented in compressor 200 at approximately Brewster's angle relative to laser beam 290.

Figure 9A:
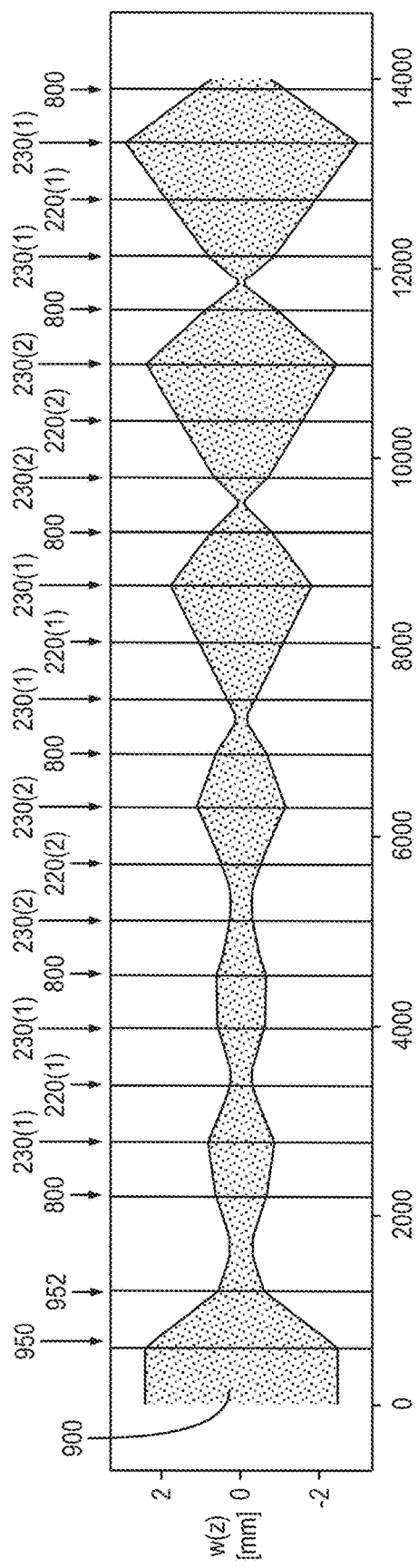
FIGS. 9A and 9B provide an example that demonstrate adjustment of broadening bulk-optic thickness to compensate for a pulse energy change.
Figure 9B:
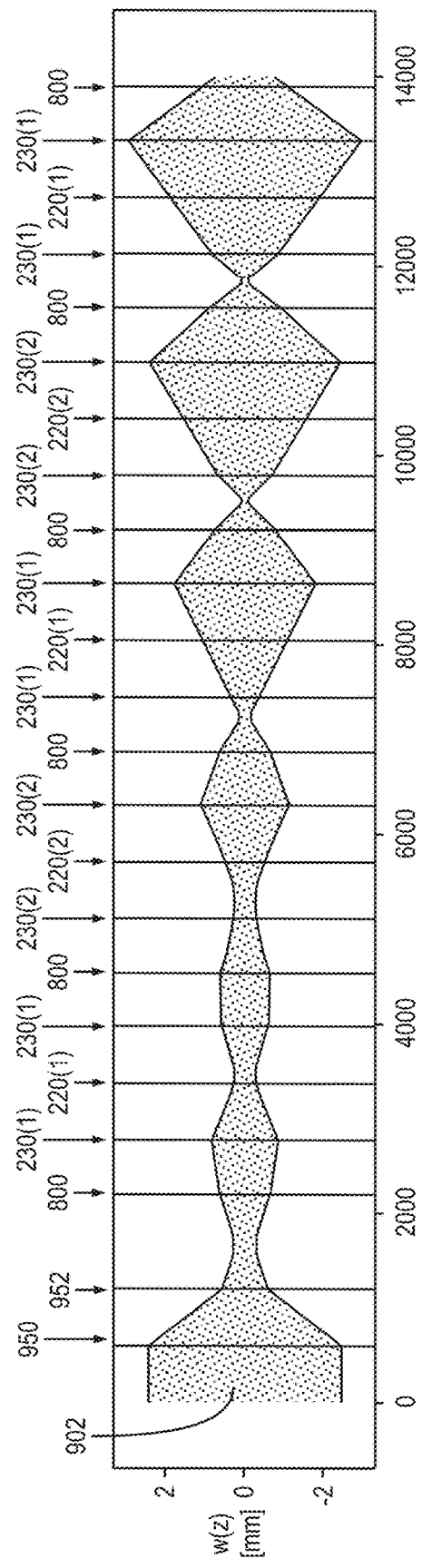

FIGS. 9A and 9B demonstrate adjustment of broadening bulk-optic thickness to compensate for a pulse energy change. FIGS. 9A and 9B plot transverse profiles 900 and 902 of laser beam 290 when propagating through one near-imaging-condition embodiment of compressor 200 that implements broadening bulk-optic pair 800. In this embodiment of compressor 200, the focal length of each concave mirror 230 is 600 mm, detuning parameter x is −30 mm, laser beam 290 completes five passes through broadening bulk-optic pair 800, and a telescope lens pair 950 and 952 demagnifies laser beam 290 to an initial waist before the first pass through broadening bulk-optic pair 800. Transverse profile 900 is calculated for a pulse energy of 2.0 mJ and a combined thickness of broadening bulk-optic pair 800 of 0.5 mm. Transverse profile 902 is calculated for a pulse energy of 0.2 mJ and a combined thickness of broadening bulk-optic pair 800 of 5.0 mm. The 10× thickness increase perfectly compensates for the 10× reduction in pulse energy, such that transverse profiles 900 and 902 are identical. Furthermore, the B-integrals and Kerr focal lengths are the same for the two scenarios associated with transverse profiles 900 and 902.

Referring again to FIG. 2, compressor 200 may implement broadening bulk-optic pair 800 (of FIG. 8) together with a photodetector 264 and a controller 266. Photodetector 264 monitors the pulse energy of laser beam 290, and controller 266 adjusts the combined thickness of broadening bulk-optic pair 800 according to the pulse energy measured by photodetector 264. Compressor 200 may include a beamsplitter 262 that directs a small fraction of each pulse of laser beam 290 toward photodetector 264. Photodetector 264 may also include functionality to monitor the size of laser beam 290. Controller 266 may be configured to adjust the location(s) of lens(es) 240, according to measurements performed by photodetector 264, to stabilize the transverse profile of laser beam 290 directed into the multipass arrangement, so as to make compressor 200 robust to variation in the transverse profile of laser beam 290 provided to compressor 200 from, e.g., laser source 260.

Figure 10:
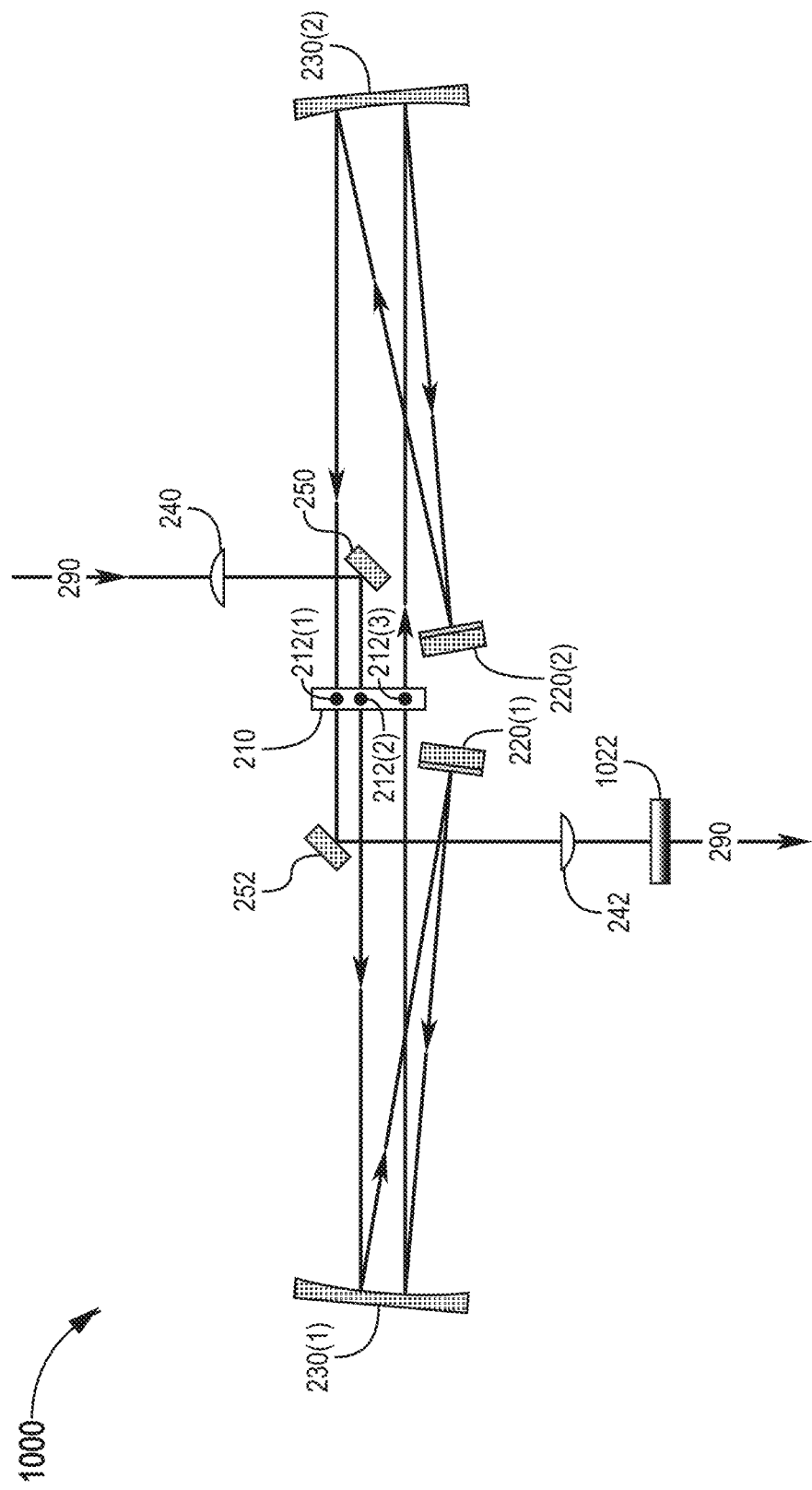
FIG. 10 illustrates a multipass ultrashort-pulse compressor configured to perform the method of FIG. 1, with the last dechirping and temporal compression step performed by a separate dispersive optic, according to an embodiment.

FIG. 10 illustrates one multipass ultrashort-pulse compressor 1000 configured to perform method 100, with the last dechirping and temporal compression step performed by a separate dispersive optic 1022. Compressor 1000 is similar to compressor 200, but (a) further includes dispersive optic 1022 and (b) is configured to direct laser beam 290 to dispersive optic 1022 instead of one or chirped mirrors 220 after the last pass through broadening bulk-optic(s) 210. Dispersive optic 1022 may be a chirped mirror or a transmissive dispersive optic, e.g., a prism pair. In compressor 1000, mirror 252 is arranged to direct laser beam 290 to dispersive optic 1022, for example via collimating lens 242. As compared to compressor 200, compressor 1000 may offer improved dechirping and resulting temporal compression by implementing a dispersive optic 1022 that is superior to chirped mirrors 220 but possibly also more complex. For example, dispersive optic 1022 may be a prism pair, whereas replacement of chirped mirrors 220 by prism pairs may not be practical inside the multipass arrangement.

Figure 11:
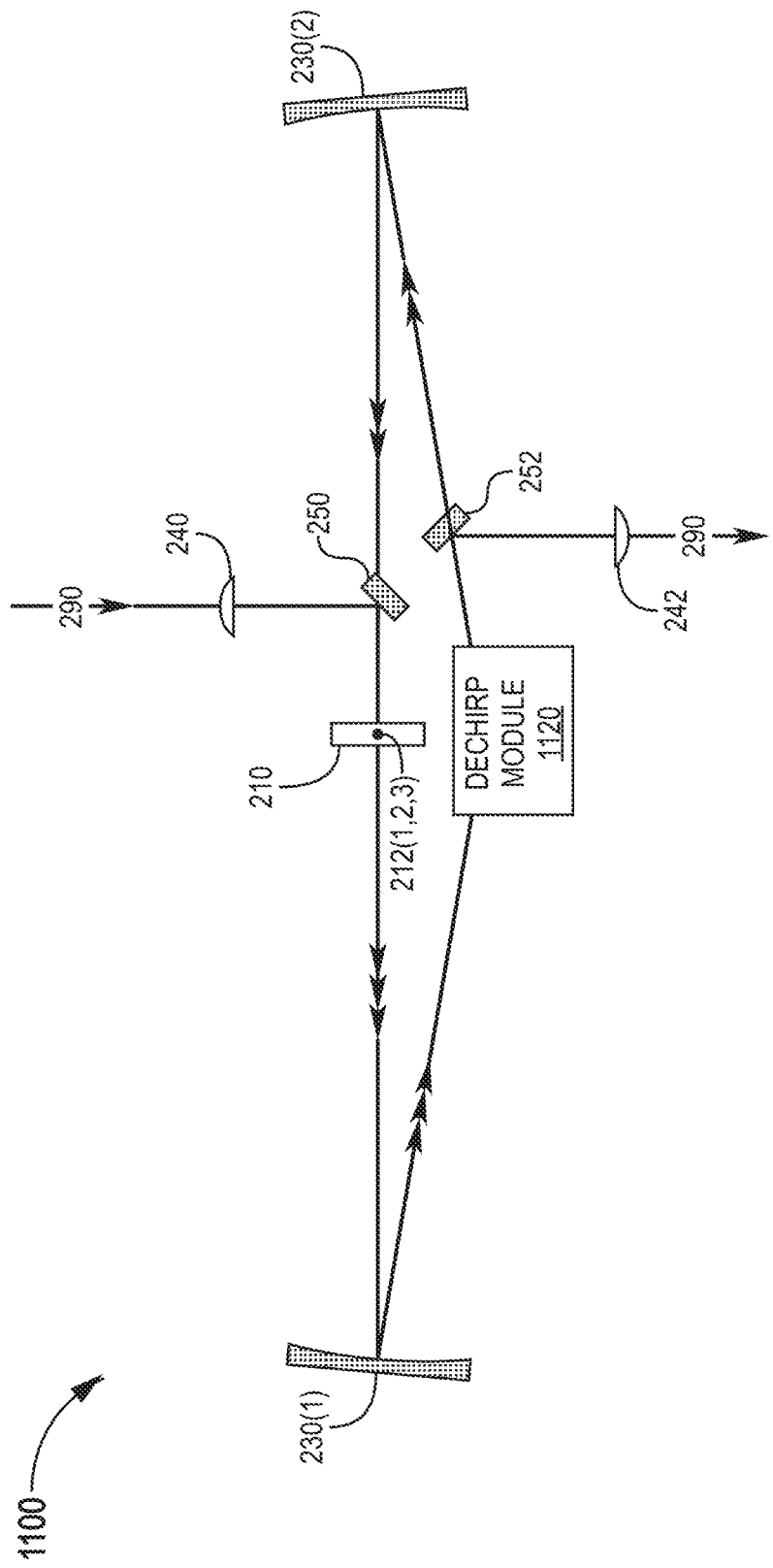
FIG. 11 illustrates a multipass ultrashort-pulse compressor configured to perform the method of FIG. 1 in a ring-scheme, according to an embodiment.

FIG. 11 illustrates one multipass ultrashort-pulse compressor 1000 configured to perform method 100 in a ring-arrangement. Compressor 1000 is similar to compressor 200 except for chirped mirrors 220 being replaced by a single dechirp module 1120 that accepts multiple passes of laser beam 290 from concave mirror 230(1), dechirps and temporally compresses each of these passes, and directs the laser beam toward concave mirror 230(2).

In the example depicted in FIG. 11, the successive passes of laser beam 290 through broadening bulk-optic(s) 210 are offset from each other in the dimension orthogonal to the plane of FIG. 11. As laser beam 290 propagates through the multipass arrangement of compressor 1100, the propagation path of laser beam 290 shifts in the dimension orthogonal to the plane of FIG. 11. As indicated in FIG. 11, compressor 1100 may include mirror 252 arranged to intercept laser beam 290 after a last pass through broadening bulk-optic(s) 210. Without departing from the scope hereof, the successive passes may instead (or also) be offset from each other in the plane of FIG. 11.

In compressor 1000, each pass of laser beam 290 through broadening bulk-optic(s) 210 propagates in the same direction. For comparison, in compressor 200, passes of laser beam 290 through broadening bulk-optic(s) 210 alternate between two opposite propagation directions.

One embodiment of dechirp module 1120 includes a prism pair that transmits laser beam 290 on its path from concave mirror 230(1) to concave mirror 230(2). Another embodiment of dechirp module 1120 includes a single chirped mirror that receives laser beam 290 from concave mirror 230(1) and reflects laser beam 290 toward concave mirror 230(2). This embodiment of dechirp module 1120 may include additional mirrors arranged to ensure that laser beam 290 is incident on the single chirped mirror at near-normal incidence.

In an alternative embodiment, not shown in FIG. 11, the last dechirping and temporal compression step in compressor 1100 is performed by a separate dispersive optic outside the multipass arrangement, such as dispersive optic 1022. In this alternative embodiment, mirror 252 intercepts the laser beam 290 after its last pass through broadening bulk-optic(s) 210 and before reaching dechirp module 1120.

As compared to compressors 200 and 1000, compressor 1100 allows for (a) the use of prism pairs in each repetition of dechirping and temporal-compression step 120, which may be deemed advantageous in some situations, or (b) elimination of one chirped mirror to operate with only a single chirped mirror. Designs with only a single chirped mirror may be cheaper, but do not offer the performance benefits provided by matched chirped mirror pairs (with mutually cancelling ripples in the group delay dispersion profile).

Figure 12:
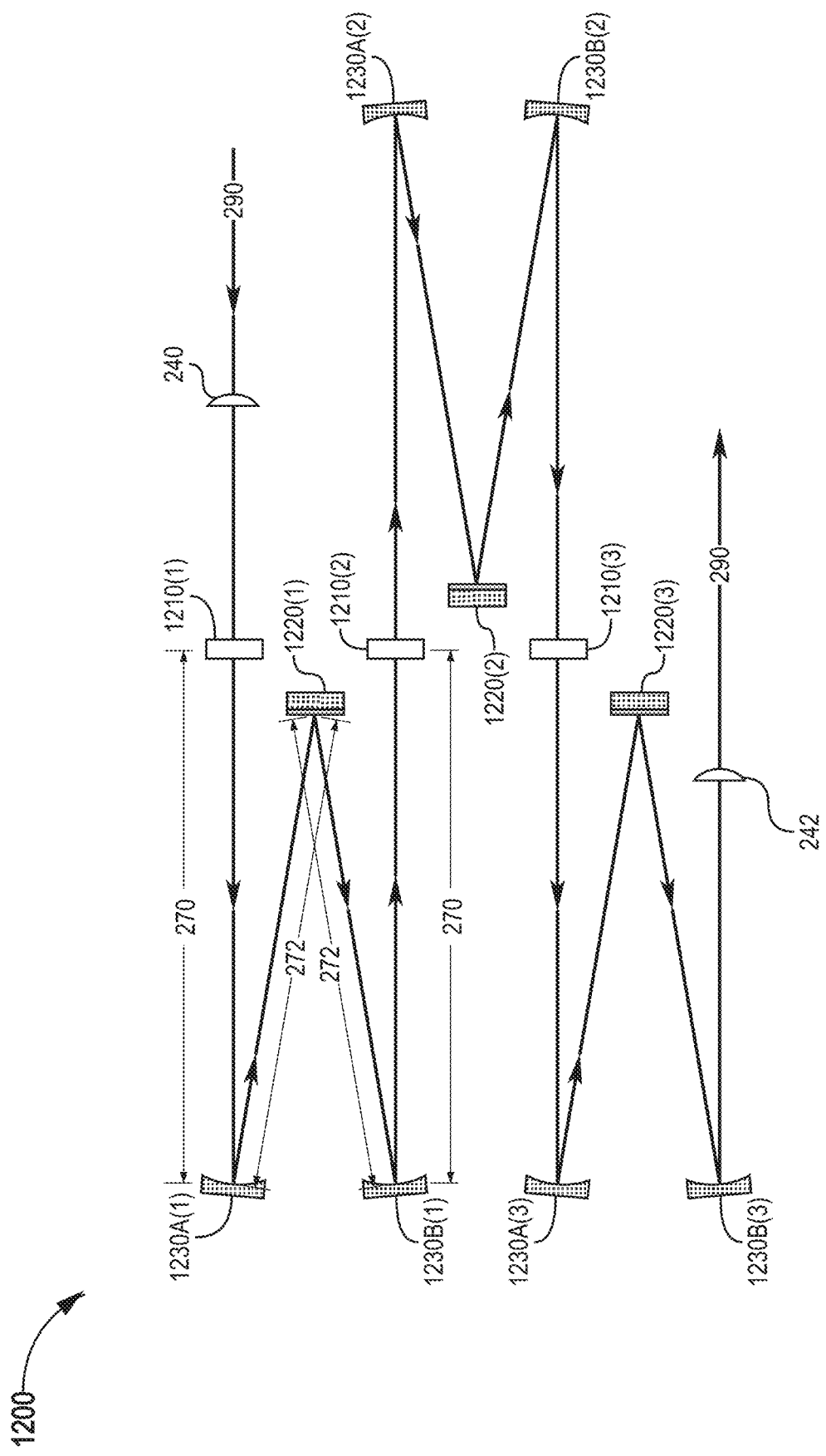
FIG. 12 illustrates an ultrashort-pulse compressor configured to perform the method of FIG. 1, with each repetition of the spectral broadening step being performed by a separate respective broadening bulk-optic, according to an embodiment.

FIG. 12 illustrates one ultrashort-pulse compressor 1200 configured to perform method 100, with each repetition of spectral-broadening step 110 being performed by a separate respective broadening bulk-optic 1210(1). Compressor 1200 includes a plurality of broadening bulk-optics 1210 or sets of broadening bulk-optics 1210, a respective plurality of chirped mirrors 1220, and a respective plurality of concave mirror pairs 1230A and 1230B. Each instance of broadening bulk-optic 1210 depicted in FIG. 12 may be a set of broadening bulk-optics, such as broadening bulk-optic pair 800, without departing from the scope hereof. Compressor 1200 may further include one or both of lenses 240 and 242, functioning as discussed above in reference to FIG. 2. The transverse profile of laser beam 290, as it propagates through compressor 1200, is the same as when laser beam 290 propagates through compressor 200. However, laser beam 290 does not make multiple passes through or via the same optical elements in compressor 1200.

In operation, laser beam 290 passes through broadening bulk-optic(s) 1210(1) to undergo a first repetition of spectral-broadening step 110, then propagates to concave mirror 1230A(1) for reflection thereby toward chirped mirror 1220(1). Laser beam 290 is then reflected by chirped mirror 1220(1) to undergo a first repetition of dechirping and temporal-compression step 120. The reflection by chirped mirror 1220(1) directs laser beam 290 to concave mirror 1230B(1) for reflection thereby. The reflection by concave mirror 1230B(1) directs laser beam 290 toward broadening bulk-optic(s) 1210(2) and, from there, onwards to a second instance of concave mirror 1230A, chirped mirror 1220, and concave mirror 1230B. This sequence may continue with additional instances of broadening bulk-optic(s) 1210, concave mirror 1230A, chirped mirror 1220, and concave mirror 1230B. In the example shown in FIG. 12, compressor 1200 has three instances of this set of optical elements such that laser beam 290 undergoes three repetitions of steps 110 and 120. Without departing from the scope hereof, compressor 1200 may instead be configured to perform two, four, or more repetitions of steps 110 and 120. Each concave mirror pair 1230A and 1230B, except for the last such concave mirror pair, ensures that the spot size of laser beam 290, when incident on each non-first instance of broadening bulk-optic(s) 1210, is greater than at the previous instance of broadening bulk-optic(s) 1210.

In each instance, concave mirror 1230A is distance 270 downstream from broadening bulk-optic(s) 1210, chirped mirror 1220 is distance 272 downstream from concave mirror 1230A, and concave mirror 1230B is distance 272 downstream from chirped mirror 1220. Each non-first instance of broadening bulk-optic(s) 1210 is distance 270 downstream from a preceding instance of concave mirror 1230B. Herein, each of distances 270 and 272 are measured along the propagation path of laser beam 290. The segments of the propagation path, associated with a distance 270 or a distance 272, may be linear or have folds not shown in FIG. 12. Distances 270 and 272 may be configured as is compressor 200, for example to realize a near-imaging-condition embodiment of compressor 1200. Broadening bulk-optic 1210 may have a common thickness or different thicknesses.

In a first alternative embodiment, concave mirrors 1230A and 1230B are replaced by respective lenses with the same focal length, and each chirped mirror 1220 is repositioned to receive laser beam 290 from a lens replacing a concave mirror 1230A and reflect laser beam 290 toward a lens replacing a concave mirror 1230B. In a second alternative embodiment, each chirped mirror 1220 is replaced by a transmissive dispersive optic, such as a prism pair, also configured to perform dechirping and temporal-compression step 120. In this second alternative embodiment, each instance of concave mirror 1230B (or an equivalent lens) is repositioned to receive laser beam 290 as transmitted by the transmissive dispersive optic replacing a preceding instance of chirped mirror 1220.

Without departing from the scope hereof, compressor 1200 may omit the last instance of concave mirror 1230B, e.g., 1230B(3) in the example shown in FIG. 12.

Compressor 1200 may be simpler to align than the multipass designs of compressors 200, 1000, and 1100. However, compressor 1200 requires more optical elements and may therefore be both expensive and bulky compared to compressors 200, 1000, and 1100, especially when a relatively large number of successive repetitions of steps 110 and 120 are required.

Figure 13:
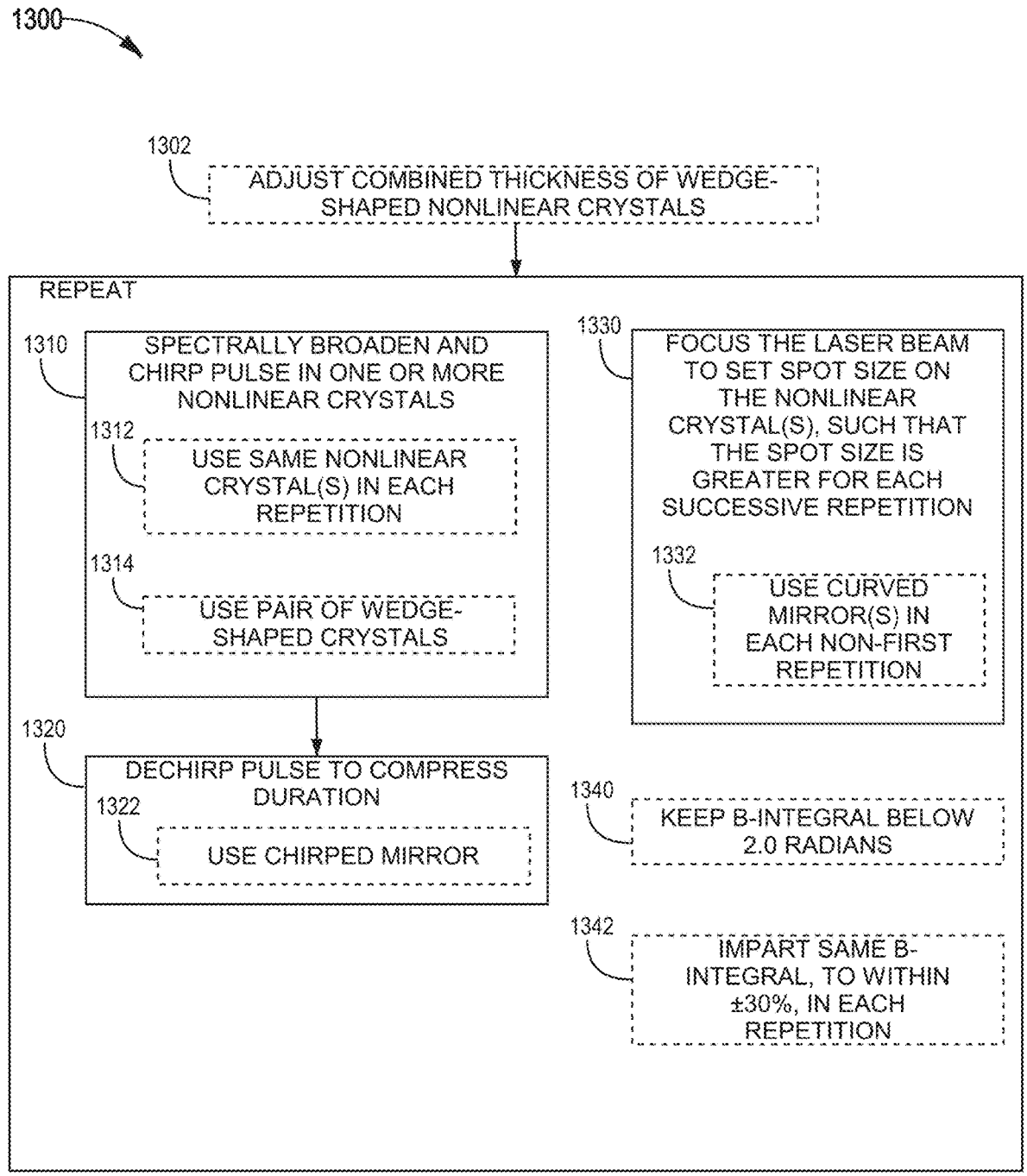
FIG. 13 is a flowchart of a method for compressing an ultrashort pulse of a laser beam, according to an embodiment.

FIG. 13 is a flowchart of one method 1300 for compressing an ultrashort pulse of a laser beam. Method 1300 is an embodiment of method 100 and may be performed by compressor 200, 1000, 1100, or 1200. Method 1300 repeats a group of steps 1310, 1320, and 1330. Steps 1310 and 1320 are embodiments of steps 110 and 120, respectively, of method 100.

Step 1310 spectrally broadens and chirps an ultrashort pulse in one or more broadening bulk-optics. In one example of step 1310, broadening bulk-optic(s) 210 or 1210 spectrally broadens and chirps an ultrashort pulse of laser beam 290, as discussed above in reference to FIGS. 2 and 12. Each repetition of step 1310 is followed by a repetition of step 1320. Step 1320 dechirps the chirped ultrashort pulse to compress its duration. In one example of step 1320, chirped mirror 220 or 1220 dechirps and compresses the chirped ultrashort pulse, as discussed above in reference to FIGS. 2 and 12. Step 1330 focuses the laser beam to set the spot size of the laser beam on the broadening bulk-optic(s), such that the spot size is greater for each successive repetition of step 1310, as discussed above in reference to FIGS. 1 and 2.

Step 1310 may implement one or both of steps 1312 and 1314. When implementing step 1312, step 1310 uses the same broadening bulk-optic (or the same set of broadening bulk-optics) to spectrally broaden the laser pulse. For example, step 1310 may use broadening bulk-optic(s) 210 as discussed above in reference to compressors 200, 1000, and 1100. When implementing step 1314, step 1310 uses a pair of wedge-shaped broadening bulk-optics to spectrally broaden the laser pulse. For example, step 1310 may use broadening bulk-optic pair 800. Step 1314 enables adjustment of the Kerr-effect focusing imparted by step 1310.

Embodiments of method 1300 that implement step 1314 may further include a step 1302 of adjusting the combined thickness of the pair of wedge-shaped broadening bulk-optics, for example to compensate for a change in pulse energy, for example as discussed above in reference to FIGS. 8, 9A, and 9B.

Step 1320 may implement a step 1322 of using a chirped mirror to dechirp and temporally compress the laser pulse. For example, step 1320 may utilize chirped mirrors 220 as discussed above in reference to FIG. 2, or chirped mirrors 1220 as discussed above in reference to FIG. 12.

Each non-first repetition of step 1330 may implement a step 1332 of using one or two concave mirrors to set the spot size at the broadening bulk-optic(s) in step 1310. In one such example, performed by either one of compressors 200 and 1000, concave mirror 230(1) sets the spot size of laser beam 290 on broadening bulk-optic(s) 210 when laser beam 290 reaches broadening bulk-optic(s) 210 from leg 280(1), while concave mirror 230(2) sets the spot size of laser beam 290 on broadening bulk-optic(s) 210 when laser beam 290 reaches broadening bulk-optic(s) 210 from leg 280(2). In another such example, performed by compressor 1200, concave mirror pair 1230A and 1230B sets the spot size of laser beam 290 on each non-first instance of broadening bulk-optic(s) 1210.

In one embodiment, method 1300 keeps the B-integral below 2.0 rad in each repetition of step 1310, in order to avoid run-away self-focusing and other undesirable outcomes. In this embodiment, the spot sizes defined by step 1330 cooperate with the configuration of the broadening bulk-optic(s) used in step 1310 to keep the B-integral below 2.0 rad (step 1340).

In another embodiment, the spot sizes defined by step 1330 cooperate with the configuration of the broadening bulk-optic(s) used in step 1310 to keep the B-integral similar in each repetition of step 1310. For example, method 1300 may keep the B-integral for each repetition of step 1310 to within ±30% of the average B-integral (as averaged over all repetitions of step 1310). This embodiment may serve to maximize the spectral broadening imparted by each repetition of step 1310 while staying below a desired maximum B-integral, such as 2.0 rad, to avoid self-focusing and other undesirable outcomes (step 1342).

Without departing from the scope hereof, the compressors and compression methods discussed above in reference to FIGS. 1-13 may serve primarily to spectrally broaden the laser pulse. In such implementations, the final duration of laser pulses produced by the compressors and compression methods may or may not be shorter than the initial duration. In the context of method 100 (see FIG. 1), the requirements to compression and dechirping in steps 120 of method 100 may be relaxed such that the duration τ of laser pulse 184 generated by a last repetition of step 120 exceeds the duration $\tau_0$ of laser pulse 180.

Also without departing from the scope hereof, the compressors and compression methods discussed above in reference to FIGS. 1-13 may, in a modification, utilize dispersive broadening bulk optic(s) and omit separate dechirping. In such embodiments, the dispersion of the broadening bulk-optic(s) dechirpes the ultrashort laser pulse while it is being spectrally broadened. For example, the broadening bulk-optic(s) may be composed of, or include, a negative-dispersion material that dechirps the ultrashort laser pulse. The negative-dispersion material may be the same material that imparts spectral broadening in the broadening bulk-optic. With the use of such dispersive broadening optic(s), method 100 may be modified to perform steps 110(1) and 120(1) simultaneously, perform steps 110(2) and 120(2) simultaneously, etc. In another example, compressor 200 is modified to replace chirped mirrors 220 with standard non-chirping mirrors, and broadening bulk-optic(s) 210 has a dispersion that dechirps the ultrashort laser pulse as it undergoes spectral broadening therein. Other compressors and compression methods discussed above in reference to FIGS. 1-13 may be similarly modified. Alternatively, the negative-dispersion material may be a reflective coating on a surface of the broadening bulk-optic. In one such example, based on a modification of compressor 200, leg 280(1) is omitted and the reflective, dispersive coating is on the side of broadening bulk-optic(s) 210 farthest from concave mirror 230(2), such that broadening bulk-optic(s) 210 receives each pass of laser beam 290 from leg 280(2) and the reflective, dispersive coating directs laser beam 290 back to leg 280(2).

In another modification, the compressors and compression methods discussed above in reference to FIGS. 1-13 may be configured as tools for spectrally narrowing a laser pulse. Such embodiments are based on bulk-optic(s) with self-phase modulation that spectrally narrows the ultrashort laser pulse instead of spectrally broadening the ultra-short laser pulse. In addition, in these embodiments, the detuning from imaging-condition may be reconfigured to cause a decreasing spot size at each successive pass through the spectrally narrowing bulk-optic(s).

The present invention is described above in terms of a preferred embodiment and other embodiments. The invention is not limited, however, to the embodiments described and depicted herein. Rather, the invention is limited only by the claims appended hereto.

What is claimed is:

1. An ultrashort-pulse compressor, comprising:
   one or more broadening bulk-optics arranged to intersect a propagation path of an ultrashort-pulsed laser beam multiple times so as to spectrally broaden a pulse of the ultrashort-pulsed laser beam during each of multiple passes through the one or more broadening bulk-optics;
   one or more dispersive optics for compressing a duration of the pulse after each of the multiple passes; and
   a plurality of focusing optics for focusing the ultrashort-pulsed laser beam between the multiple passes, the plurality of focusing optics being arranged around the one or more broadening bulk-optics;
   wherein distances, along the propagation path, between successive passes through the one or more broadening bulk-optics are detuned from imaging such that a spot size of the ultrashort-pulsed laser beam at the one or more broadening bulk-optics is greater at each successive one of the multiple passes.

2. The compressor of claim 1, wherein, for each pair of successive passes:
the propagation path between the successive passes goes from one pass through the one or more broadening bulk-optics via one of the plurality of focusing optics, having focal length f, to one of the dispersive optics and then via one of the plurality of focusing optics, also having focal length f, to another pass through the one or more broadening bulk-optics; and
length of the propagation path between the successive passes is 2(2f+x), absolute value of x being greater than zero and less than f.

3. The compressor of claim 2, wherein, said one of the dispersive optics is at a midpoint of the propagation path between the successive passes.

4. The compressor of claim 2, wherein the absolute value of x is less than 0.1f.

5. The compressor of claim 1, wherein:
the dispersive optics include a plurality of chirped mirrors each positioned on the propagation path between a respective pair of successive passes;
the plurality of focusing optics include a plurality of concave mirrors each positioned on the propagation path between a respective pair of successive passes; and
each of the multiple passes goes through a same one or same ones of the one or more broadening bulk-optics.

6. The compressor of claim 5, wherein the one or more broadening bulk-optics consist of a single broadening bulk-optic.

7. The compressor of claim 5, wherein the one or more broadening bulk-optics include a pair of wedge-shaped broadening bulk-optics having a combined thickness in the ultrashort-pulsed laser beam that is adjustable by changing positions of the wedge-shaped broadening bulk-optics relative to each other.

8. The compressor of claim 5, wherein:
the concave mirrors include first and second concave mirrors facing opposite first and second sides, respectively, of said same one or same ones of the one or more broadening bulk-optics; and
the chirped mirrors include first and second chirped mirrors respectively facing the first and second concave mirrors such that the propagation path makes several repetitions between the first and second chirped mirrors via the first and second concave mirrors and through said same one or same ones of the one or more broadening bulk-optics.

9. The compressor of claim 8, wherein length of the propagation path, between said same one or same ones of the one or more broadening bulk-optics, and each of the first and second chirped mirrors, exceeds two times a focal length of a corresponding one of the first and second concave mirrors by a fraction of the focal length.

10. The compressor of claim 8, wherein:
length of the propagation path, between the first concave mirror and the first chirped mirror, equals a focal length of the first concave mirror;
length of the propagation path, between the first concave mirror and said same one or same ones of the one or more broadening bulk-optics, deviates from the focal length of the first concave mirror by a fraction of the focal length of the first concave mirror;

length of the propagation path, between the second concave mirror and the second chirped mirror, equals a focal length of the second concave mirror; and
length of the propagation path, between the second concave mirror and said same one or same ones of the one or more broadening bulk-optics, deviates from the focal length of the second concave mirror by the same or another fraction of the focal length of the second concave mirror.

11. The compressor of claim 8, further including:
an initial focusing optic for focusing the ultrashort-pulsed laser beam prior to a first one of the multiple passes; and
a final focusing optic for collimating the ultrashort-pulsed laser beam after a last one of the multiple passes.

12. The compressor of claim 11, further comprising:
a first steering mirror arranged to direct the ultrashort-pulsed laser beam to said same one or same ones of the one or more broadening bulk-optics, after being focused by the initial focusing optic; and
a second steering mirror arranged to direct the ultrashort-pulsed laser beam to the final focusing optic after the last one of the multiple passes.

13. The compressor of claim 8, wherein the propagation path reaches one of the first and second chirped mirrors after a last one of the multiple passes.

14. The compressor of claim 8, wherein:
the propagation path reaches neither the first nor the second chirped mirror after a last one of the multiple passes; and
the dispersive optics further include a third dispersive optic arranged to compress the pulse after the last one of the multiple passes.

15. The compressor of claim 1, wherein each of the multiple passes has a B-integral that is within 30% of the B-integral averaged over the multiple passes.

16. The compressor of claim 1, wherein the one or more broadening bulk-optics include a plurality of broadening bulk-optics alternating with the dispersive optics along the propagation path.

17. The compressor of claim 1, wherein the one or more dispersive optics and the plurality of focusing optics are arranged such that the propagation path of the ultrashort-pulsed laser beam, between each pair of successive passes through the one or more broadening bulk-optics, goes first to one of the plurality of focusing optics, then to one of the one or more dispersive optics, and then to one of the plurality of focusing optics.

18. The compressor of claim 1, wherein the one or more dispersive optics are separate from the one or more broadening-bulk optics, and the plurality of focusing optics are separate from both the one or more broadening-bulk optics and the one or more dispersive optics.

19. A method for compressing an ultrashort pulse of a laser beam, comprising:
repeating a group of steps of:
spectrally broadening and chirping the ultrashort pulse in one or more broadening bulk-optics,
dechirping the ultrashort pulse, after the spectrally broadening step, to compress duration of the ultrashort pulse, and
focusing the laser beam to set a spot size of the laser beam on the one or more broadening bulk-optics in the spectrally broadening step;
wherein propagation distances of the laser beam between the spectrally broadening step of each successive repetition of the group of steps are detuned from imaging such that the spot size, in the one or more broadening bulk-optics, is greater for each successive repetition of the group of steps.

20. The method of claim 19, wherein:
in each but a first repetition of the group of steps, the focusing step comprises two steps of modifying divergence angle of the laser beam with a focusing optic having a focal length f, such that the laser beam forms a waist between the two steps of modifying divergence angle; and
a propagation path of the laser beam between each pair of successive repetitions of the spectrally broadening step has length 2(2f+x) with x having absolute value greater than zero and less than f.

21. The method of claim 20, wherein the absolute value of x is less than 0.1f.

22. The method of claim 20, wherein the propagation path has length f+x from the first one of the pair of successive repetitions of the spectrally broadening step to the first one of the two steps of modifying divergence angle, length 2f between the two steps of modifying divergence angle to the compressing step, and length f+x from the second one of the two steps of modifying divergence angle to the second one of the pair of successive repetitions of the spectrally broadening step.

23. The method of claim 22, wherein, within each repetition of the group of steps, a same focusing optic performs each of the two steps of modifying divergence angle steps, and the compressing step is performed between the two steps of modifying divergence angle.

24. The method of claim 19, wherein a same one or same ones of the one or more broadening bulk-optics performs each successive repetition of the spectrally broadening step.

25. The method of claim 24, wherein each successive repetition of the spectrally broadening step imparts, on the laser beam, a B-integral that is within 30% of the B-integral averaged over the successive repetitions.

26. The method of claim 24, wherein each successive repetition of the spectrally broadening step imparts, on the laser beam, a B-integral that is less than 2.0 radians.

27. The method of claim 24, wherein the compressing step is performed by one or more chirped mirrors in at least each successive repetition that is not a last repetition.

28. The method of claim 27, wherein the focusing step is performed by a concave mirror in each successive repetition that is not a first repetition.

29. The method of claim 24, wherein the one or more broadening bulk-optics include a pair of wedge-shaped broadening bulk-optics, and the method further comprises a step of adjusting a combined thickness of the pair of wedge-shaped broadening bulk-optics in the laser beam by changing positions of the wedge-shaped broadening bulk-optics relative to each other.

30. The method of claim 19, wherein the step of dechirping is performed with one or more dispersive optics separate from the one or more broadening bulk-optics, and the step of focusing is performed with a plurality of focusing optics separate from both the one or more broadening bulk-optics and the one or more dispersive optics.

* * * * *